United States Patent
Pan

(10) Patent No.: US 11,375,001 B2
(45) Date of Patent: Jun. 28, 2022

(54) FILE TRANSMISSION METHOD AND APPARATUS

(71) Applicant: Alibaba Group Holding Limited, Grand Cayman (KY)

(72) Inventor: Shanjun Pan, Zhejiang (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/289,489

(22) Filed: Feb. 28, 2019

(65) Prior Publication Data

US 2019/0199776 A1 Jun. 27, 2019

Related U.S. Application Data

(63) Continuation of application No. PCT/CN2017/103853, filed on Sep. 28, 2017.

(30) Foreign Application Priority Data

Oct. 12, 2016 (CN) .......................... 201610892302.3

(51) Int. Cl.
  *G06F 15/16* (2006.01)
  *H04L 67/06* (2022.01)
  (Continued)

(52) U.S. Cl.
  CPC .............. *H04L 67/06* (2013.01); *G06F 21/10* (2013.01); *G06F 21/604* (2013.01);
  (Continued)

(58) Field of Classification Search
  CPC ........................... G06F 21/6209; H04L 63/101
  See application file for complete search history.

(56) References Cited

U.S. PATENT DOCUMENTS

| 4,908,521 A | 3/1990 | Boggan et al. |
| 7,263,528 B2 | 8/2007 | Haff et al. |

(Continued)

FOREIGN PATENT DOCUMENTS

| CN | 1161922 C | 8/2004 |
| CN | 1946109 A | 4/2007 |

(Continued)

OTHER PUBLICATIONS

Translation of Office Action from corresponding CN Patent Application No. 201610892302, dated Mar. 11, 2020, 10 pages.

(Continued)

*Primary Examiner* — Hieu T Hoang
(74) *Attorney, Agent, or Firm* — Lee & Hayes, P.C.

(57) ABSTRACT

A method and an apparatus for file transmission are provided. The method may include receiving a file sending request initiated by a source user for a preset file; sending an approval message for the file sending request to an approval user corresponding to the source user when the source user does not have a transmission privilege for the preset file; and setting the preset file as an obtainable state for a target user corresponding to the file sending request in response to the approval message being approved by the approval user. The technical solutions of the present disclosure can prevent an approval operation of a file from interrupting a communication process between users, help to simplify user operations, and improve the smoothness of the communication process.

20 Claims, 21 Drawing Sheets

(51) Int. Cl.
*G06F 21/62* (2013.01)
*G06F 21/10* (2013.01)
*G06F 21/60* (2013.01)
*H04L 9/40* (2022.01)
*H04L 67/306* (2022.01)

(52) U.S. Cl.
CPC ........ *G06F 21/606* (2013.01); *G06F 21/6209* (2013.01); *H04L 63/101* (2013.01); *H04L 63/205* (2013.01); *H04L 67/306* (2013.01)

(56) References Cited

U.S. PATENT DOCUMENTS

| | | | |
|---|---|---|---|
| 7,587,368 B2 | 9/2009 | Felsher | |
| 8,751,534 B2* | 6/2014 | Kawano | G06F 21/6218 707/783 |
| 9,171,180 B2* | 10/2015 | Prabaker | G06F 17/00 |
| 9,378,386 B1* | 6/2016 | Saylor | G06F 21/6245 |
| 9,419,951 B1 | 8/2016 | Felsher et al. | |
| 9,641,470 B2 | 5/2017 | Smullen et al. | |
| 9,769,243 B2 | 9/2017 | Myka et al. | |
| 9,876,798 B1* | 1/2018 | Lewis | G06F 21/6218 |
| 10,484,452 B2* | 11/2019 | Reyes | H04M 7/0027 |
| 11,030,390 B2* | 6/2021 | Mullins | G06F 40/106 |
| 2003/0167207 A1 | 9/2003 | Berardi et al. | |
| 2005/0149759 A1 | 7/2005 | Vishwanath et al. | |
| 2005/0216473 A1 | 9/2005 | Aoyagi et al. | |
| 2006/0235851 A1* | 10/2006 | Akachi | H04N 7/15 |
| 2006/0293914 A1 | 12/2006 | Fukuoka | |
| 2007/0028110 A1 | 2/2007 | Brennan | |
| 2007/0071199 A1* | 3/2007 | Ozeki | H04N 1/4433 379/142.05 |
| 2007/0220068 A1 | 9/2007 | Thompson et al. | |
| 2009/0150169 A1* | 6/2009 | Kirkwood | G06Q 40/00 705/342 |
| 2011/0060789 A1 | 3/2011 | Xiang et al. | |
| 2014/0067865 A1* | 3/2014 | Kirigin | G06F 21/6218 707/783 |
| 2014/0188991 A1* | 7/2014 | Dhara | H04L 67/306 709/204 |
| 2015/0133084 A1* | 5/2015 | Baek | H04M 1/67 455/411 |
| 2015/0294377 A1* | 10/2015 | Chow | G06Q 30/0263 705/347 |
| 2016/0308855 A1* | 10/2016 | Lacey | H04L 67/10 |
| 2016/0337291 A1* | 11/2016 | Park | H04L 51/32 |
| 2017/0012984 A1 | 1/2017 | Dang et al. | |
| 2017/0111368 A1 | 4/2017 | Hibbert et al. | |
| 2017/0187720 A1* | 6/2017 | Cretella | H04L 67/06 |
| 2017/0353525 A1* | 12/2017 | Choi | H04L 67/06 |
| 2019/0075134 A1 | 3/2019 | Ylonen | |

FOREIGN PATENT DOCUMENTS

| | | |
|---|---|---|
| CN | 101114979 A | 1/2008 |
| CN | 101286952 A | 10/2008 |
| CN | 102571723 A | 7/2012 |
| CN | 102710633 A | 10/2012 |
| CN | 102843356 A | 12/2012 |

OTHER PUBLICATIONS

Translation of Search Report from corresponding CN Patent Application No. 2016108923023, dated Mar. 2, 2020, 2 pages.
Translation of Search Report from corresponding PCT Application No. PCT/CN2017/103853, dated Jan. 8, 2017, 3 pages.
Translation of Written Opinion from corresponding PCT Application No. PCT/CN2017/103853, dated Jan. 8, 2018, 3 pages.

* cited by examiner

FILE TRANSMISSION METHOD AND APPARATUS

CROSS REFERENCE TO RELATED PATENT APPLICATIONS

This application claims priority to and is a continuation of PCT Patent Application No. PCT/CN2017/103853 filed on 28 Sep. 2017, and is related to and claims priority to Chinese Patent Application No. 201610892302.3, filed on 12 Oct. 2016, entitled "File Transmission Method and Apparatus," which are hereby incorporated by reference in their entirety.

TECHNICAL FIELD

The present disclosure relates to the field of communication technologies, and particularly to file transmission methods and apparatuses.

BACKGROUND

In related technologies, a communication application provides a file transfer function, so that files can be directly transferred between users through the communication application. However, in some special scenarios, an approval for a file transfer is needed. For example, when a cross-enterprise scenario is involved, if a communication user inside an enterprise needs to transfer files to a communication user outside the enterprise, an approval is first initiated to an approval user, and a file transfer operation can be performed only after the approval is passed. This increases the complexity of user operations on the one hand, and requires a user to repeatedly switch between communication and approval initiation on the other hand, interrupting a normal communication process.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, the present disclosure provides a file transmission method and an apparatus thereof, which can avoid an auditing operation of a file to interrupt a communication process between users, and help simplify user operations and improve the smoothness of the communication process.

To achieve the above objectives, the present disclosure provides the following technical solutions.

In implementations, a file transmission method is provided, which includes receiving a file sending request initiated by a source user for a preset file; sending an approval message for the file sending request to an approval user corresponding to the source user when the source user does not have a transmission privilege for the preset file; and setting the preset file as an obtainable state for a target user corresponding to the file sending request in response to the approval message being approved by the approval user.

In implementations, a file transmission method is provided, which includes detecting a file sending operation initiated by a source user to a target user for a preset file in a communication session page of the source user and the target user; and initiating a file sending request for the preset file to a server and sending an approval message for the preset file to an approval user corresponding to the source user when the source user does not have a transmission privilege for the preset file, wherein the preset file is set by the server as an obtainable state for the target user when the approval message is approved by the approval user.

In implementations, a file transmission method is provided, which includes sending a notification message for a preset file to a corresponding target user in response to receiving a file sending request initiated by a source user for the preset file, the notification message including an access entry for the preset file to be used for performing an access operation on the preset file by the target user through the access entry; sending an approval message for the file sending request to an approval user corresponding to the source user when the source user does not have a transmission privilege for the preset file; and setting the preset file as an obtainable state for the target user to cause the access operation to be responded in response to the approval message being approved by the approval user.

In implementations, a file transmission apparatus is provided, which includes a receiving unit that receives a file sending request initiated by a source user for a preset file; a sending unit that sends an approval message for the file sending request to an approval user corresponding to the source user when the source user does not have a transmission privilege for the preset file; and a setting unit that sets the preset file as an obtainable state for a target user corresponding to the file sending request in response to the approval message being approved by the approval user.

In implementations, a file transmission apparatus is provided, which includes a detection unit that detects a file sending operation initiated by a source user to a target user for a preset file in a communication session page of the source user and the target user; and a showing unit that initiates a file sending request for the preset file to a server and sends an approval message for the preset file to an approval user corresponding to the source user when the source user does not have a transmission privilege for the preset file, wherein the preset file is set by the server as an obtainable state for the target user when the approval message is approved by the approval user.

In implementations, a file transmission apparatus is provided, which includes a notification unit that sends a notification message for a preset file to a corresponding target user in response to receiving a file sending request initiated by a source user for the preset file, the notification message including an access entry for the preset file to be used for performing an access operation on the preset file by the target user through the access entry; a sending unit that sends an approval message for the file sending request to an approval user corresponding to the source user when the source user does not have a transmission privilege for the preset file; and a setting unit that sets the preset file as an obtainable state for the target user to cause the access operation to be responded in response to the approval message being approved by the approval user.

As can be seen from the above technical solutions, the present disclosure actively generates and sends a corresponding approval message when receiving a file sending request, and actively completes subsequent operations related to a file transfer after the approval is passed, so that a user only needs to initiate the file sending request without paying attention to approval and file transfer processes. On the one hand, user operations can be simplified. On the other

DETAILED DESCRIPTION

Figure 1:
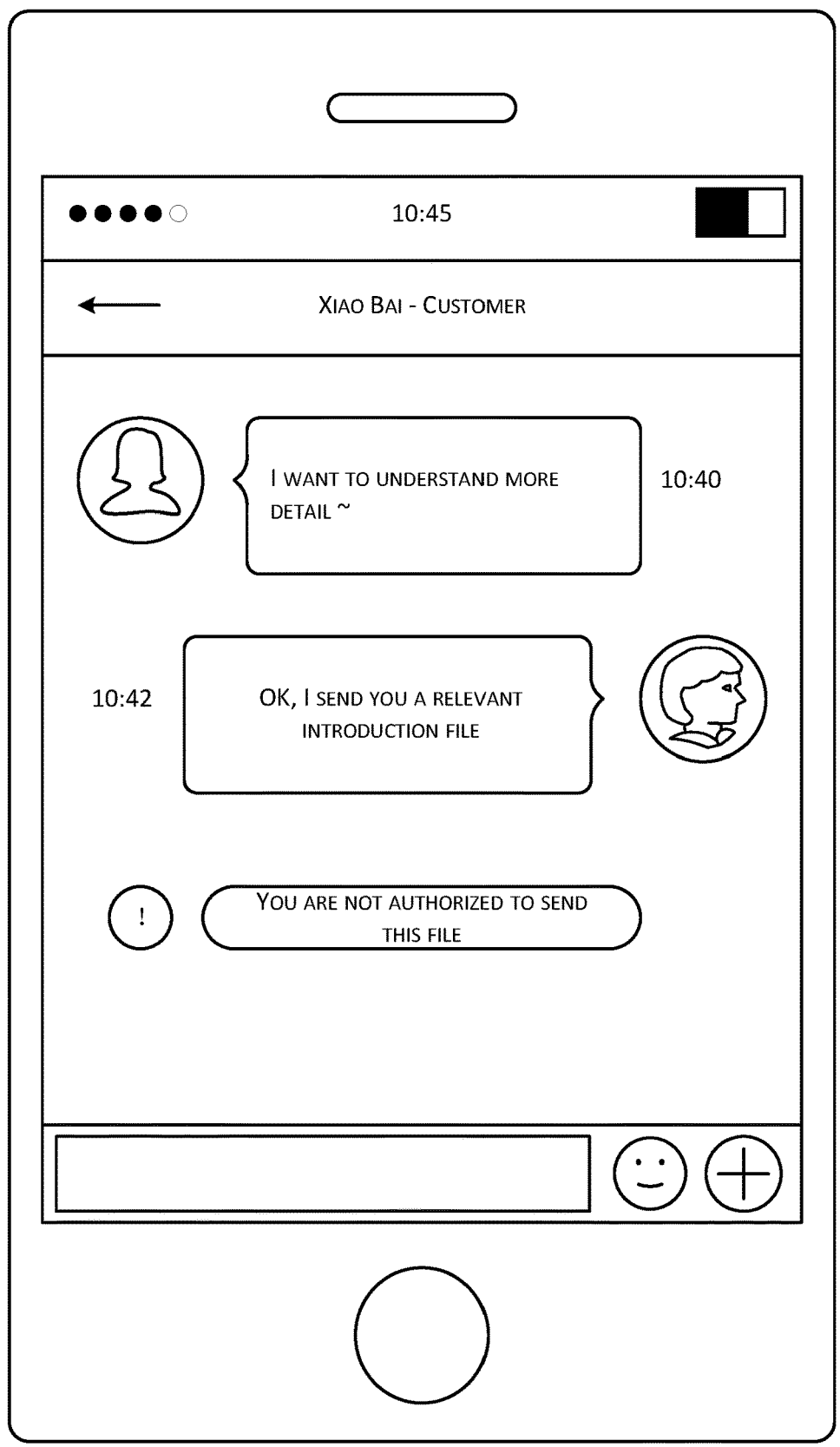
FIG. 1 is a schematic diagram of a communication session page in related technologies.

FIG. 1 is a schematic diagram of a communication session page in related technologies. As shown in FIG. 1, a user "Xiao Hei" is assumed to conduct communications with a user "Xiao Bai" through a communication session page provided by a preset communication application. When the user "Xiao Hei" wishes to send a file to the user "Xiao Bai", the user "Xiao Hei" will not be able to complete a file sending operation if the user "Xiao Hei" does not have a transmission privilege for that file. The communication session page will show prompt information such as "You are not authorized to send this file" to the user "Xiao Hei".

Figure 2:
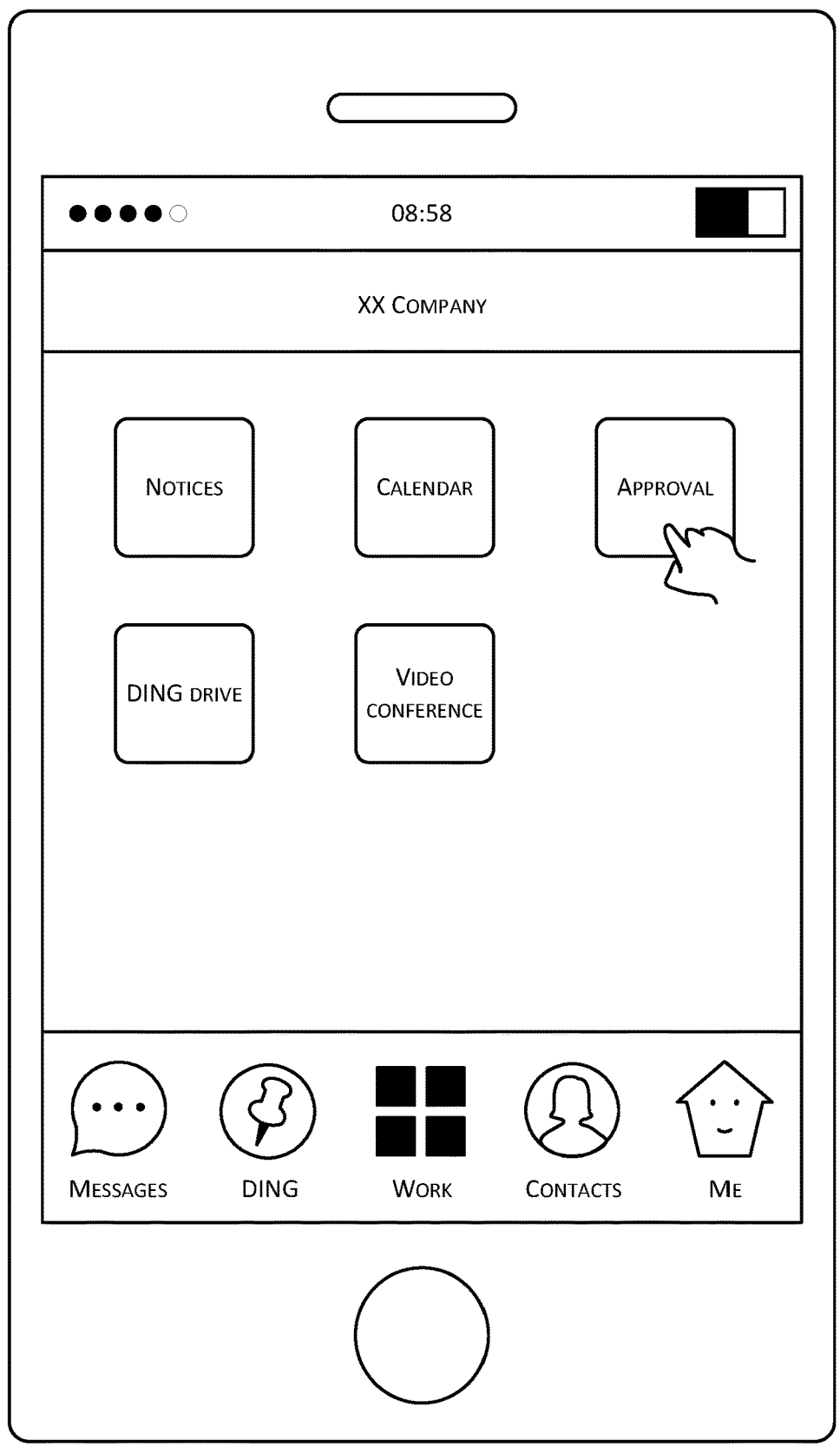
FIG. 2 is a schematic diagram of an interface related to initiating an approval event in the related technologies.

As shown in FIG. 2, the communication application includes a plurality of tabs such as "Messages", "DING", "Work", "Contacts", and "Me", where the communication session page comes from the "Message" tab. When the user "Xiao Hei" does need to transfer a relevant file to the user "Xiao Bai", the user "Xiao Hei" can switch to the "Work" tab from the "Messages" tab. and initiate an approval event for the file to a relevant approval user through an "approval" function provided in the "Work" tab. As such, when the approval event is approved, the user "Xiao Hei" has the right to send the file to the user "Xiao Hei".

However, in the above process, the user "Xiao Hei" needs to exit from the communication session page with the user "Xiao Bai", switch to the "Work" tab, create an approval event, and then return to the communication session page. This not only is cumbersome and complicated, but also completely separates "approval" from "communication", resulting in a forced interruption of the communication process, which greatly affects the efficiency of communication and application experience of the user in the communication process.

Therefore, the present disclosure improve file transmission schemes to solve the above problems in the related technologies. In order to further illustrate the present disclosure, the following examples are provided.

Figure 3:
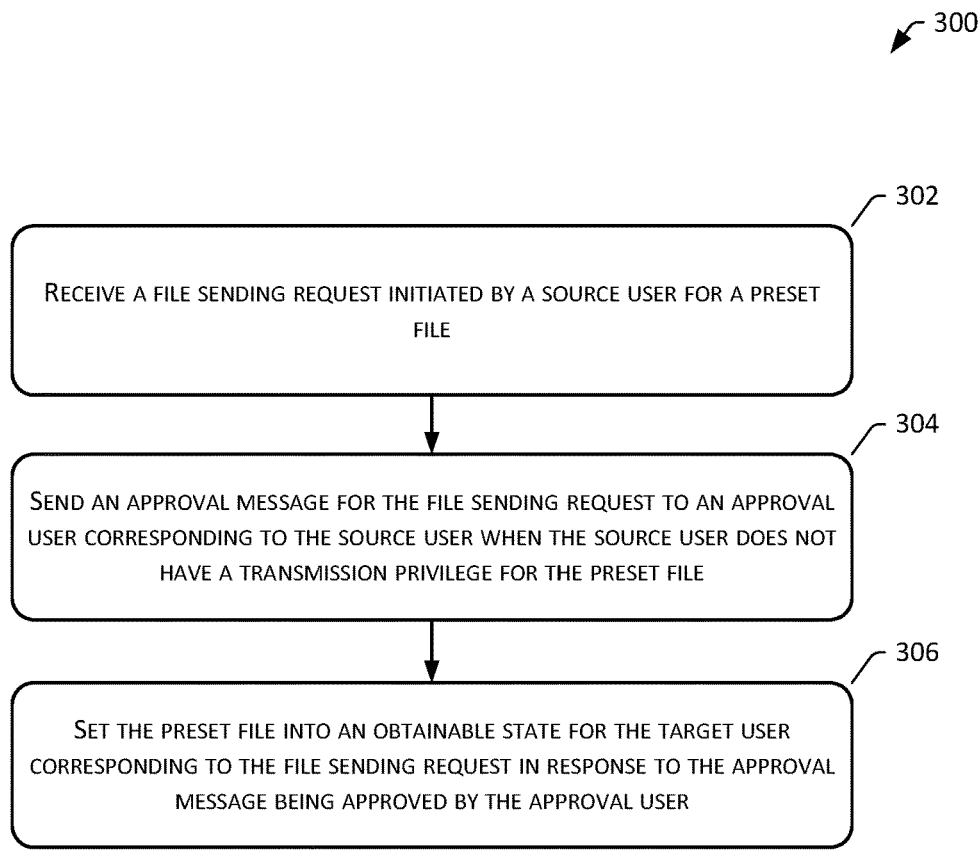
FIG. 3 is a flowchart of a file transmission method according to an exemplary embodiment of the present disclosure.

FIG. 3 is a flowchart of a file transmission method 300 according to an exemplary embodiment of the present disclosure. As shown in FIG. 3, the method 300 is applied in a server of a communication application, and may include the following operations.

Operation 302: Receive a file sending request initiated by a source user for a preset file.

In implementations, a communication session page between a source user and a target user can provide a file transfer function, so that the source user can complete operations such as selecting, adding, and sending files in the communication session page.

In implementations, a file selected by the source user may be stored locally or in the cloud. When the file is stored locally, the file can be included in a file sending request and uploaded to a server by the source user. When the source user does not have a transmission privilege for that file, the file is temporarily stored on the server, and is not transmitted to the target user. When the file is stored in the cloud, for example, when the source user belongs to an arbitrary group, such arbitrary group has a corresponding cloud storage space that is pre-created on a server, and the file is stored in the cloud storage space as internal data of the arbitrary group. Only internal members of that arbitrary group have privileges to perform operations such as reading, downloading, etc., on that file, and are restricted from transmitting the file to external members. When the target user does not belong to that arbitrary group, the server may not perform any operation on the file after receiving the file sending request. Apparently, even if the source user and the target user belong to a same group, the source user and the target user may still have different operation privileges. This may cause the source user to have privileges to perform operations such as reading, downloading, etc., on files in a cloud storage space corresponding to that group, but the target user does not have such privileges. In this case, the source user should also be restricted from transferring the files in the cloud storage space to the target user.

In implementations, the communication application may include any communication application such as an instant messaging application, an email, etc., that support an approval function. An instant messaging application is used as an example. The communication application in the present disclosure may be an enterprise instant messaging (EIM) application, such as "DING Talk", etc. Apparently, the present disclosure does not have any limitations thereon.

In implementations, the target user may be a single user, i.e., the communication session page may be a separate communication page between the source user and the target user (i.e., a single chat window in an instant messaging application). Alternatively, the target user may also be a plurality of users, i.e., the above communication session page can be a group communication page between the source user and the target user (i.e., a group chat window in an instant messaging application).

Operation 304: Send an approval message for the file sending request to an approval user corresponding to the source user when the source user does not have a transmission privilege for the preset file.

In implementations, respective group attribution information of the source user and the target user may be separately obtained. When the respective group attribution information of the source user and the target user is inconsistent and the preset file belongs to a group to which the source user belongs, a cross-group transmission of the file (internal and external of the group) is involved. In this case, a determination can be made that the source user does not have a transmission privilege for the preset file, to avoid a random leakage of internal files of the group.

Apparently, due to the source user and the target user belonging to different departments in a same group, or a file transmission rule requiring that approvals are conducted for all activities of file transmission, or an existence of other reasons, an approval operation may still be needed for a file transfer operation initiated by the source user to the target user to ensure information security, even if the respective group attribution information of the source user and the target user is consistent.

In implementations, each file may be pre-configured with a corresponding security level. In this case, according to a security level of the preset file, a specific approval user corresponding to such security level may be selected from all approved users corresponding to the source user, and an approval message may be sent to the specific approval user. The higher the security level of the file is, the higher the management authority level in the group the corresponding specific approval user can have. For example, a low-level file can be examined and approved by a group leader of the source user, and a high-level file needs to be examined and approved by a department head of the source user.

In implementations, a notification message regarding an approval status of the preset file may be sent to at least one of the source user and the target user. For example, when the target user knows that the approval is passed, a related access operation such as previewing, downloading, etc., for the file can be triggered as soon as possible. When the source user knows that the approval has not been completed, a reminder request can be initiated for the relevant approval message, so that the server can send a corresponding reminder message to the approval user according to the reminder request to remind the approval user to process the approval message.

Operation 306: Set the preset file into an obtainable state for the target user corresponding to the file sending request in response to the approval message being approved by the approval user.

In implementations, when the approval message is approved by the approval user, the server does not need to actively send the file to the target user, but may only grant the target user an access privilege for the preset file, and cause an access operation that is performed on the preset file by the target user to be responded, i.e., allowing the target user to control a start of a transmission of the preset file. For example, when the approval message is approved, if the target user is in a non-WIFI environment, the target user can wait for switching to a WIFI environment, and then actively trigger an access operation such as downloading of the preset file to reduce the cost of data transmission and increase the efficiency of data transmission.

The server may send a notification message for the preset file to the target user in response to receiving the file sending request. The notification message includes an access entry for the preset file. The target user performs the access operation on the preset file through the access entry. When the approval message has not been approved, since the target user does not have an access privilege for the preset file, the access operation for the preset file is rejected. When the approval message is approved, the access operation for the preset file is responded because the target user obtains the access privilege for the preset file.

Apparently, after the approval message is approved by the approval user, the server can directly transmit the preset file to the target user, so that the target user can view the preset file at any time without waiting for a process of transmission of the preset file.

As can be seen from the above technical solutions, the present disclosure actively generates and sends a corresponding approval message when receiving a file sending request, and actively completes subsequent operations related to file transmission after an approval is passed, so that a user only needs to initiate a file sending request without paying attention to approval and file transmission processes. On the one hand, user operations can be simplified. On the other hand, the user can quickly return to a communication process after the file sending request is initiated, thus avoiding an interruption of the normal communication process.

Figure 4:
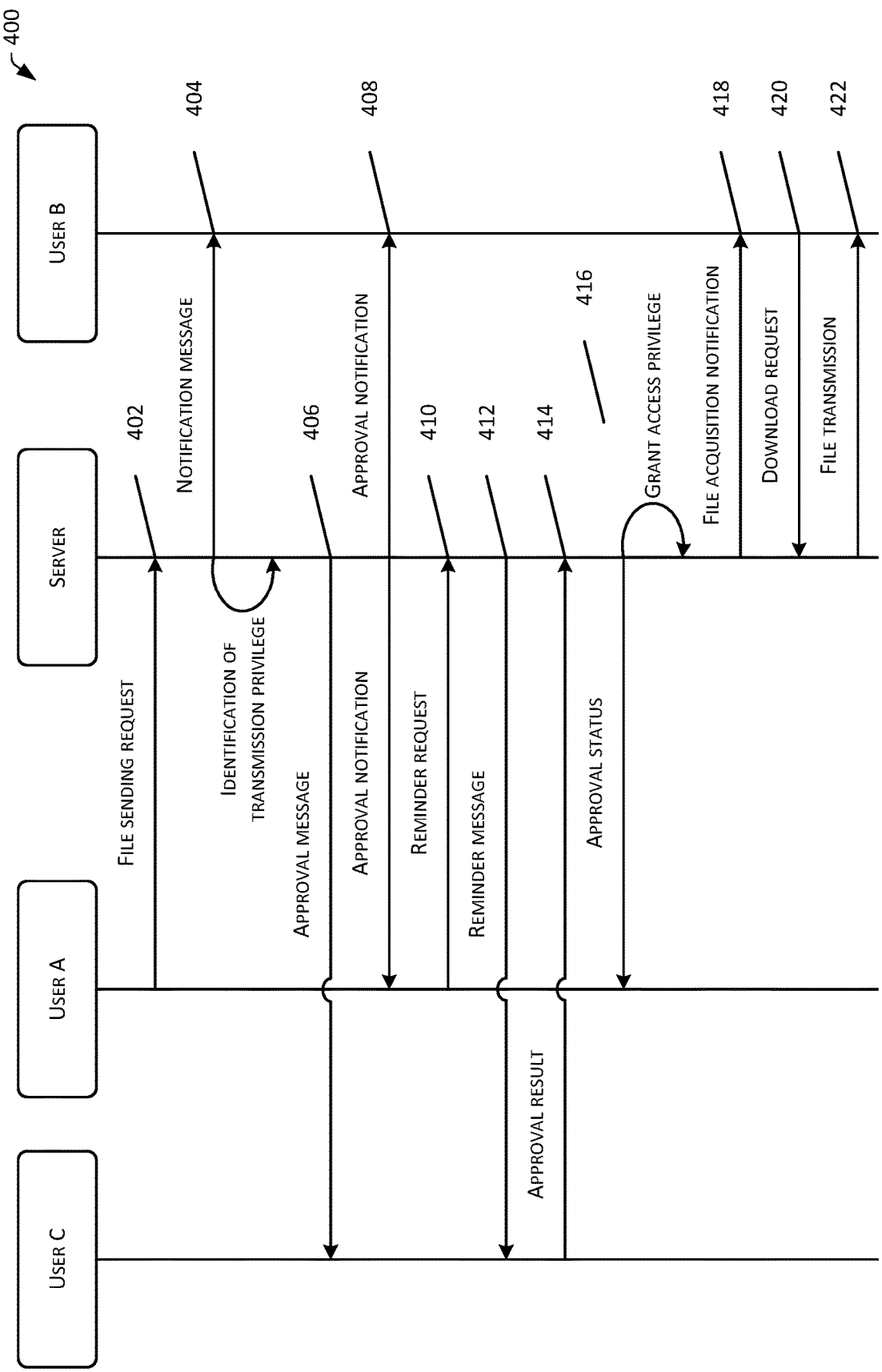
FIG. 4 is a flowchart of another file transmission method according to an exemplary embodiment of the present disclosure.

FIG. 4 is a flowchart of another file transmission method 400 according to an exemplary embodiment of the present disclosure. As shown in FIG. 4, "User A" represents a client corresponding to a user A. The user A installs an application program of a communication application of the present disclosure on an electronic device such as a mobile phone, a tablet, or a PC, and logs into a registered account corresponding to the user A, so that the electronic device is configured as the corresponding client. Similarly, "User B" and "User C" represent respective clients that are logged in with registered accounts of a user B and a user C. A server end of the communication application of the present disclosure is configured and loaded in a server, so that a file transmission solution of the present disclosure are implemented by data interactions between the server end and each client. The file transmission method 400 may include the following operations.

Operation 402: The server end receives a file sending request from the user A.

Figure 5:
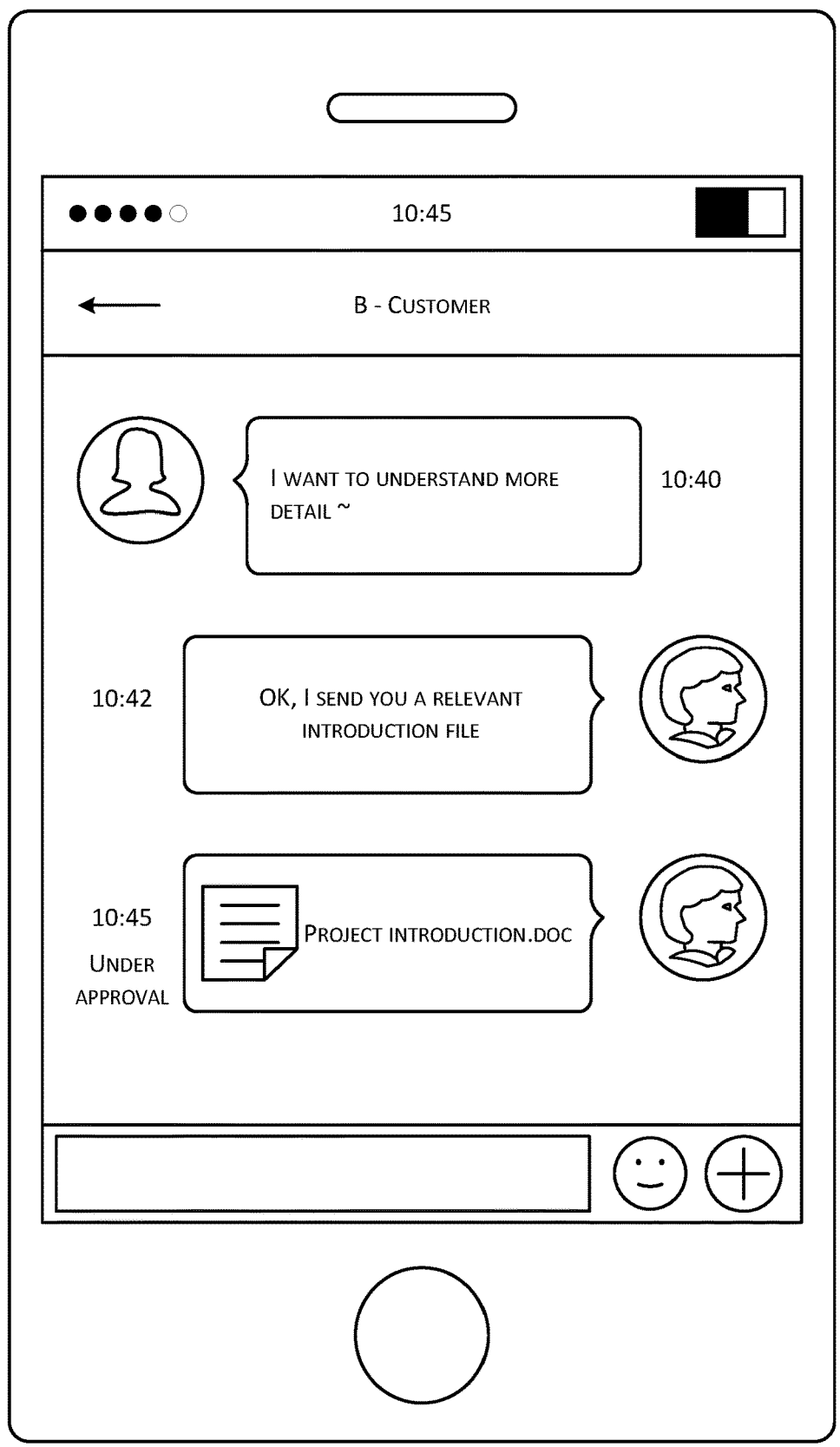
FIG. 5 is a schematic diagram of a communication session page according to an exemplary embodiment of the present disclosure.

In implementations, the user A can activate a corresponding file sending function through a communication session page as shown in FIG. 5 by triggering, for example, a "s" identifier shown in the lower right corner of the page, thereby selecting a file that needs to be sent in the communication session page, and sending a corresponding file sending request to the server without switching to another page to avoid an interruption of communication.

In implementations, after sending a file sending request through the communication session page shown in FIG. 5, the user A can view a message box and content thereof such as "project introduction.doc" in the communication session page as shown in FIG. 5. The user A can consider this as having completed a "sending" operation of a file, and can quickly return to a communication process with the user B even without the need of following subsequent approval and file transmission operations.

If A belongs to a group "XX company", such group can create a corresponding cloud storage space on the server end to store file data that is internal to the group, so that internal members of the group can perform operations, such as viewing, etc., on the file data of the cloud storage space. Other users outside the group cannot access the cloud storage space. The user A can use a file in the cloud storage space as the aforementioned file that needs to be sent, and initiate a file sending request for the file. At this time, since the file is located in the cloud, the server does not actually perform any operations on the file before actually performing a transmission operation on the file, although a sending operation of the file "project introduction.doc" appears to have been "completed" in FIG. 5.

Apparently, in addition to files in the cloud storage space, the user A can also initiate a file sending request for a local file. In this case, the local file can be included in the file sending request (or separately) and uploaded to the server, and temporarily stored in a pre-configured storage space by the server. Similarly, the server does not actually perform any operations on the file until a transmission operation is actually performed on the file.

Operation 404: The server sends a notification message related to the file sending request to the user B, and identifies a transmission privilege of the user A for a related file.

Figure 6:
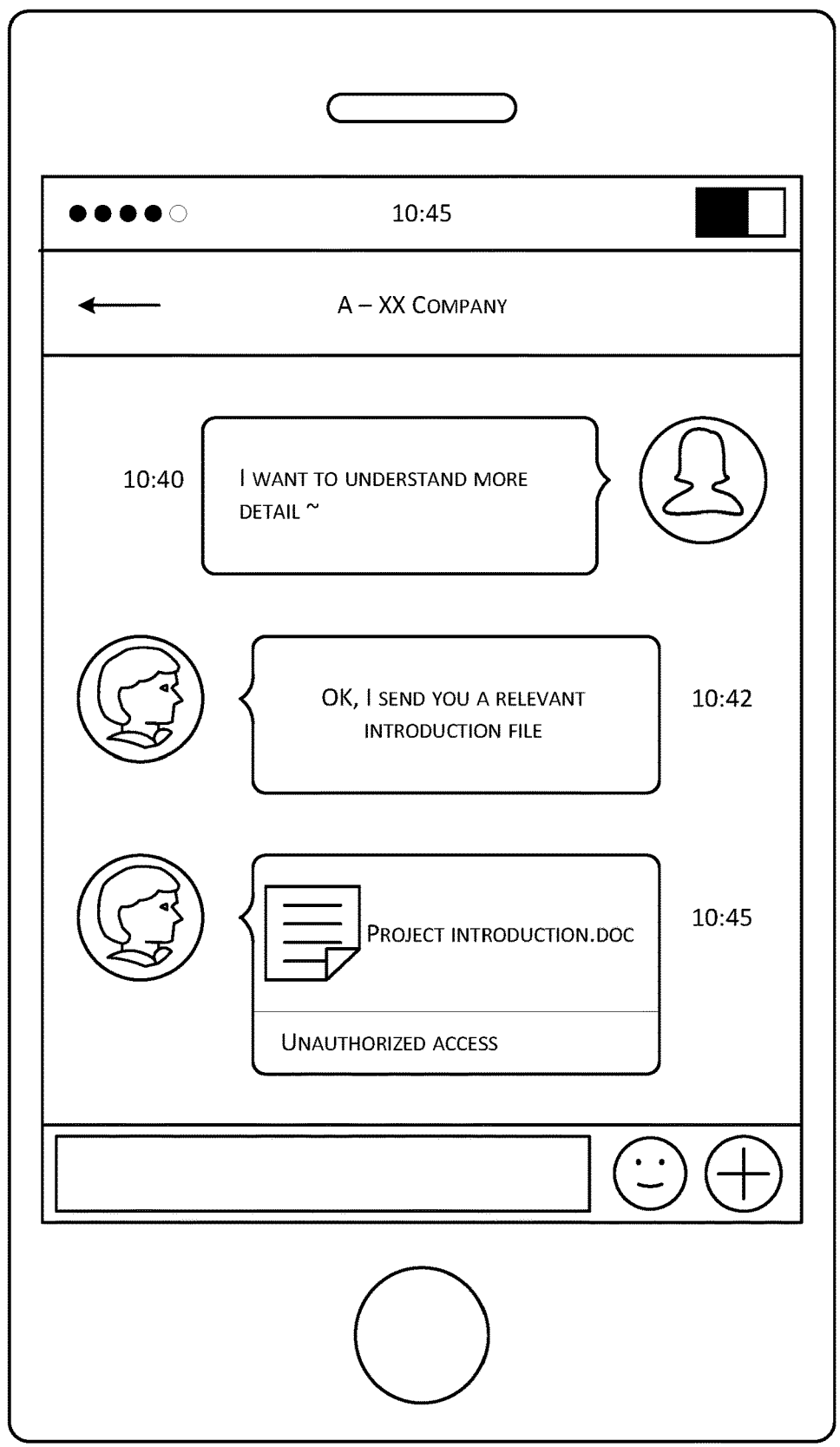
FIG. 6 is a schematic diagram of a communication session page according to an exemplary embodiment of the present disclosure.

In implementations, for the received notification message, the user B who acts as a target user can view the message box and the content thereof such as "project introduction.doc" in the communication session page as shown in FIG. 6. Apparently, the user B has indeed not obtained the file yet. However, the user B can determine therefrom that the user A has sent the related file.

In implementations, the server may separately obtain respective group attribution information of the user A (who acts as a source user) and the user B (who acts as the target user). For example, when the file selected by the user A comes from the XX company to which the user A belongs, if the user B does not belong to the XX company, i.e., the respective group attribution information between the user A and the user B is inconsistent, the server can determine that the user does not have a transmission privilege for the file.

Operation 406: When the user A does not have a transmission privilege for the related file, the server sends a corresponding approval message to the user C.

In implementations, the server may determine that an approval user corresponding to the user A is the user C according to the group attribution information of the user A and organization structure information of the group to which the user A belongs. For example, the user C may be an immediate leader of the user A, or another group member having an approval authority for the user A.

Furthermore, if all the files in the cloud storage space of the group to which the user A belongs are pre-configured with corresponding security levels, the server can determine a corresponding approval user according to a security level corresponding to the file selected by the user A. Moreover, a positive correlation exists between a management level of the approval user in the group and the security level.

Operation 408: The server sends corresponding approval notifications to the user A and the user B for the approval message that is sent to the user C to inform the user A and the user B about a transmission status of the approval message.

In implementations, according to the approval notifications sent by the server, communication session pages corresponding to the user A and the user B may display corresponding prompt information in associated areas of related message boxes respectively. For example, the user A can view "under approval" prompt information on the left side of a message box as shown in FIG. 5, and the user B can view "unauthorized access" prompt information in a message box as shown in FIG. 6, both indicating that the relevant approval message has not been approved.

Operation 410: The server receives a reminder request initiated by the user A for the approval message.

Operation 412: The server sends a reminder message to the user C regarding the approval message.

Figure 7:
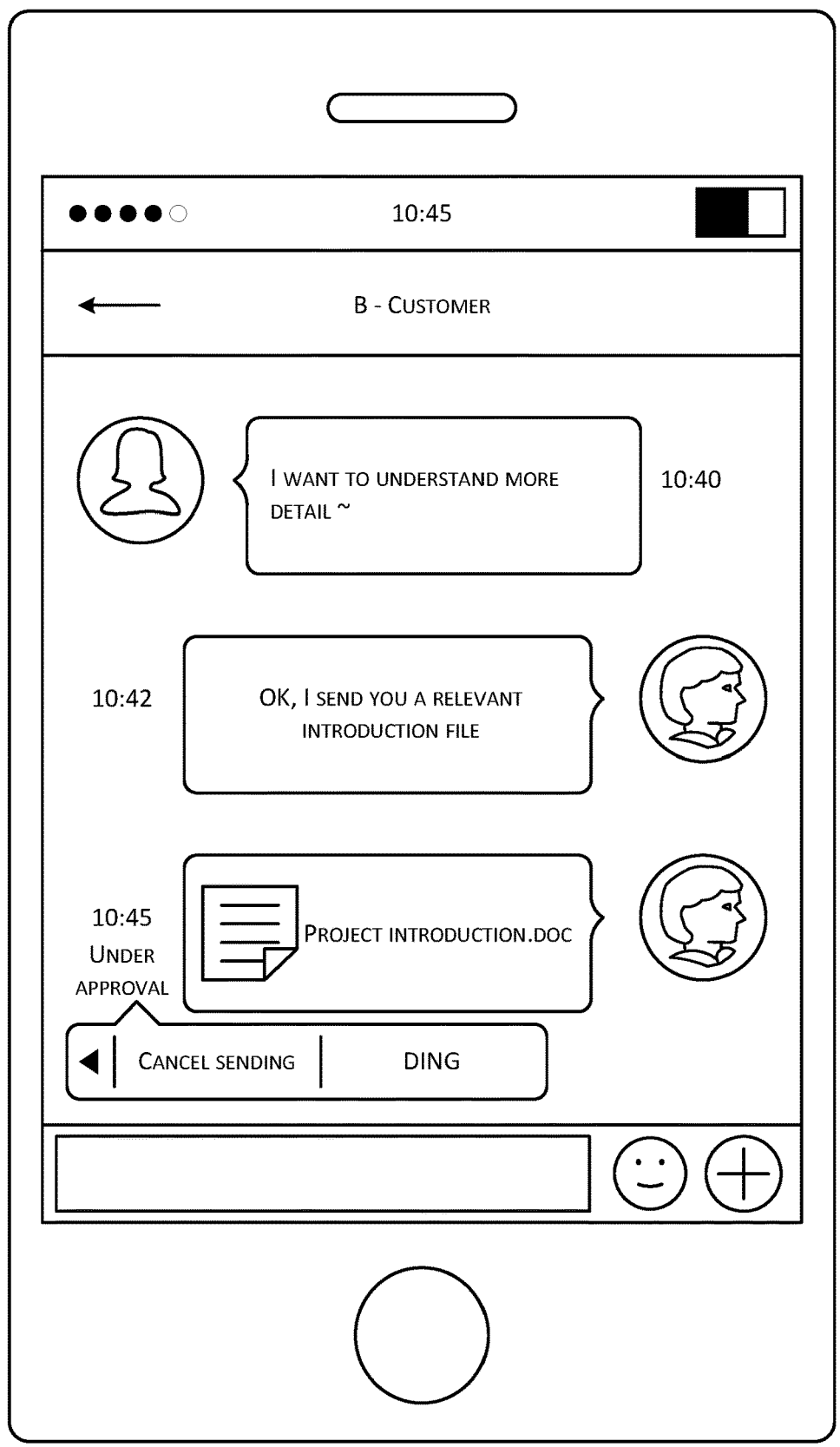
FIG. 7 is a schematic diagram of a communication session page according to an exemplary embodiment of the present disclosure.

In implementations, the user A can trigger a function box as shown in FIG. 7 by triggering the prompt information such as "under approval" as shown in FIG. 5. The function box includes functional options such as "cancel sending", "DING", etc. When the user A triggers "DING", a reminder request for the above-mentioned approval message may be initiated to the server, so that the server sends a DING message (i.e., a reminder message) to the user C to remind the user C to process the approval message as soon as possible accordingly. The DING message may be sent using an instant messaging message in the application, or may be sent using a short message, or may be sent using a voice broadcast during a call process.

In addition, if the user chooses to trigger "cancel sending" as shown in FIG. 7, the server can revoke the approval message that has been sent to the user C, and recall the message box and its content of the most recent communication session message (a transmission message for the file "project introduction.doc") as shown in FIG. 5 and FIG. 6, thereby terminating the transmission process of the related file.

Operation 414: The server receives an approval result of the user C regarding the approval message.

Operation 416: The server sends a notification message of a corresponding approval status to the user A according to the approval result, and grants the user B an access privilege of the related file.

Figure 8:
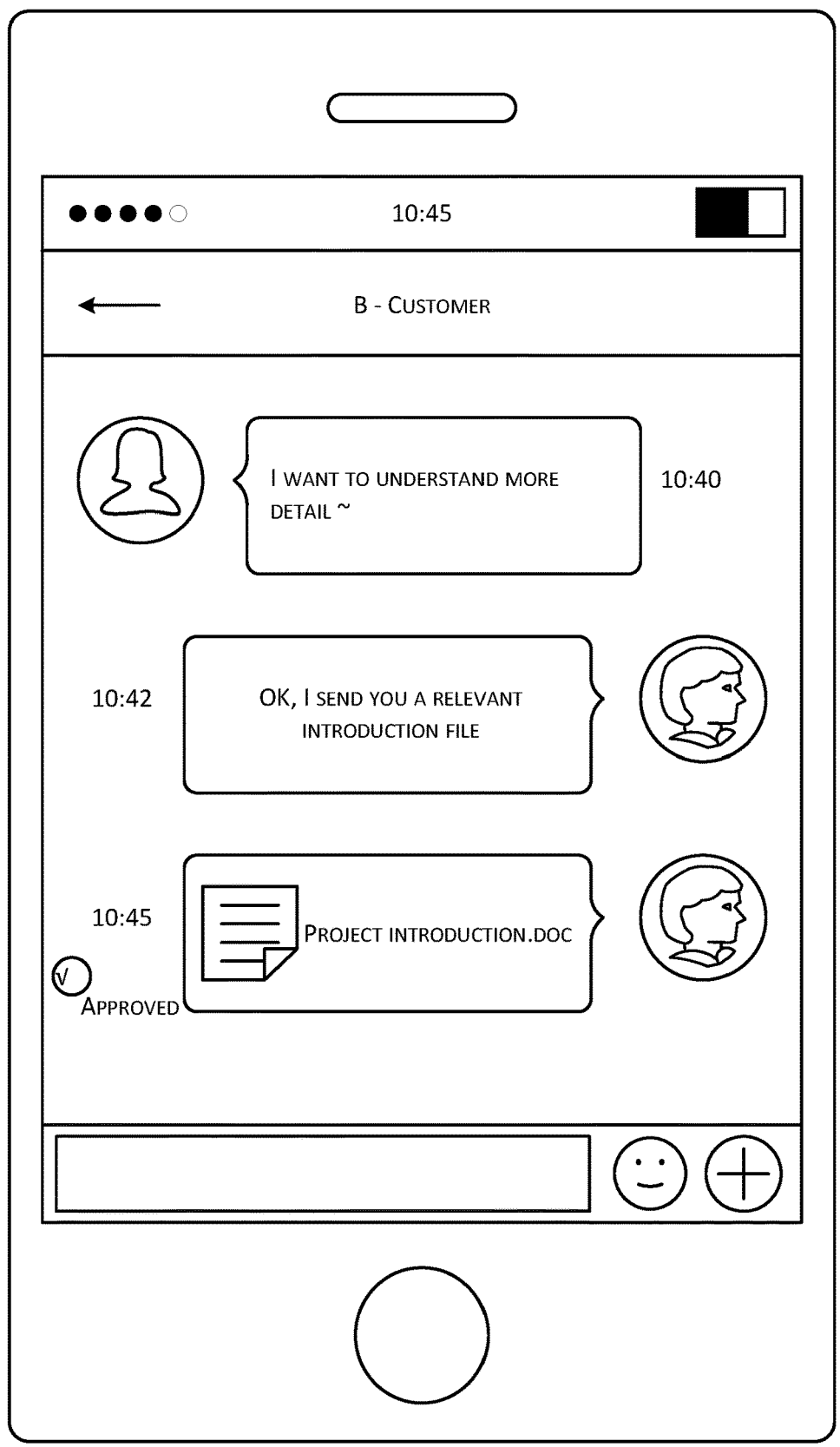
FIG. 8 is a schematic diagram of a communication session page according to an exemplary embodiment of the present disclosure.

In implementations, according to the notification message to the approval status, the user A can be presented with a corresponding approval result. For example, when the approval result indicates that the approval is passed, "under approval" as shown in FIG. 5 may be updated to "✓ approved" as shown in FIG. 8, etc. When the approval result indicates that the approval is failed, corresponding prompt information can be displayed.

Operation 418: The server sends a file acquisition notification for the related file to the user B.

Figure 9A:
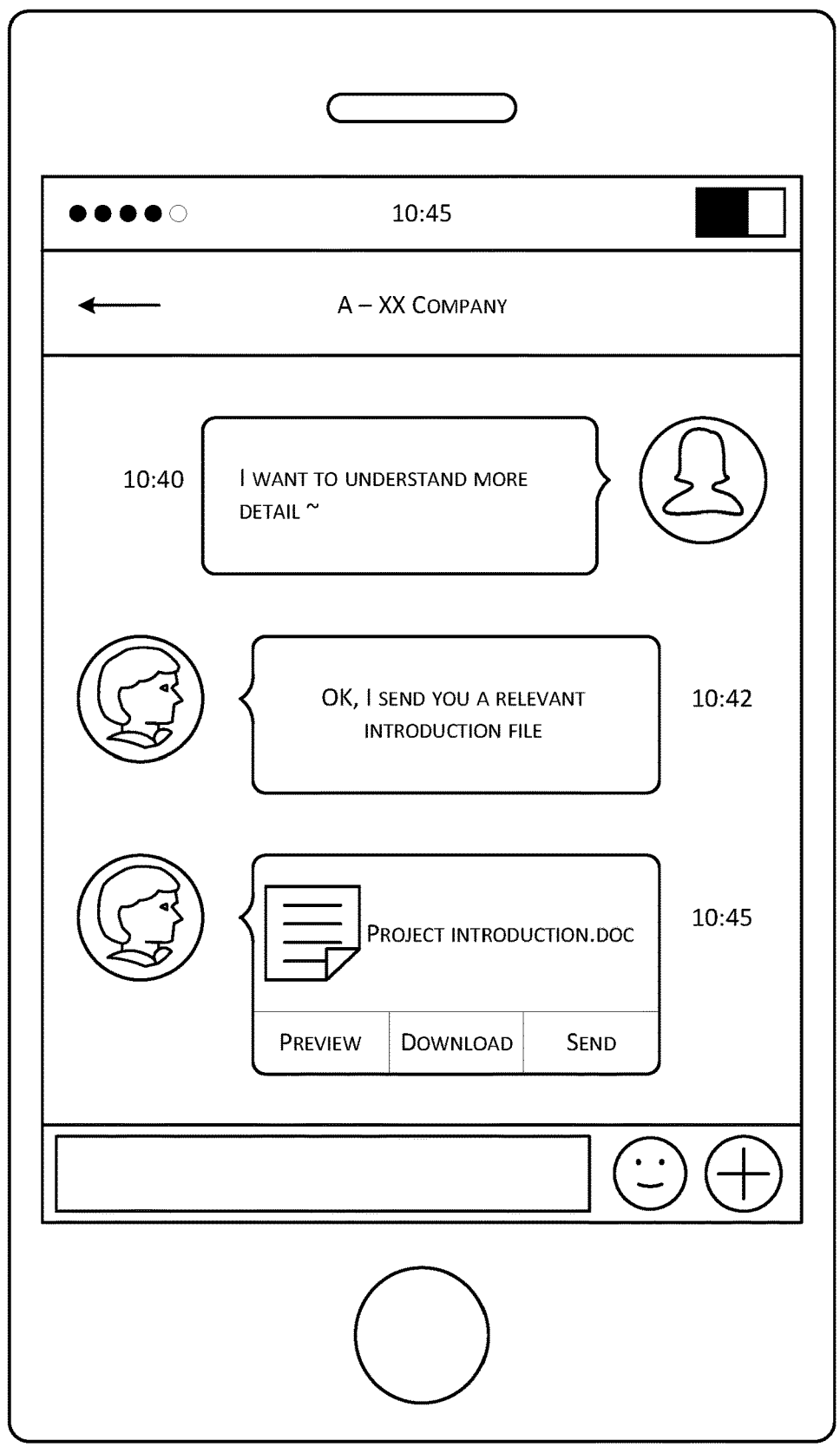
FIG. 9A is a schematic diagram of a communication session page according to an exemplary embodiment of the present disclosure.

In implementations, after receiving the file acquisition notification, the electronic device of the user B may update "unauthorized access" shown in FIG. 6 to functional options such as "preview", "download" and "transfer" as shown in FIG. 9A, so that the user B performs a corresponding operation such as previewing, downloading or transferring on the related file. Apparently, the above functional options may not be displayed, but a text such as "You already have an access privilege" may be prompted, which is not limited by the present disclosure.

In implementations, a waiting period necessarily exists after the user B receives the notification message regarding the file sending request through operation 404 and until the user C completes the approval operation of the approval message. During the waiting period, the user A and the user B can perform communication conversations as normal. On the one hand, these communication conversations will result in an annihilation of the above notification message, so that the user B may need to search the page to look for the notification message. On the other hand, the user B may even forget the existence of the notification message due to a relatively large number of communication conversations. In short, the foregoing reasons or other reasons may cause the user B fail to obtain an access to the related file quickly through the access entry included in the notification message.

Figure 9B:
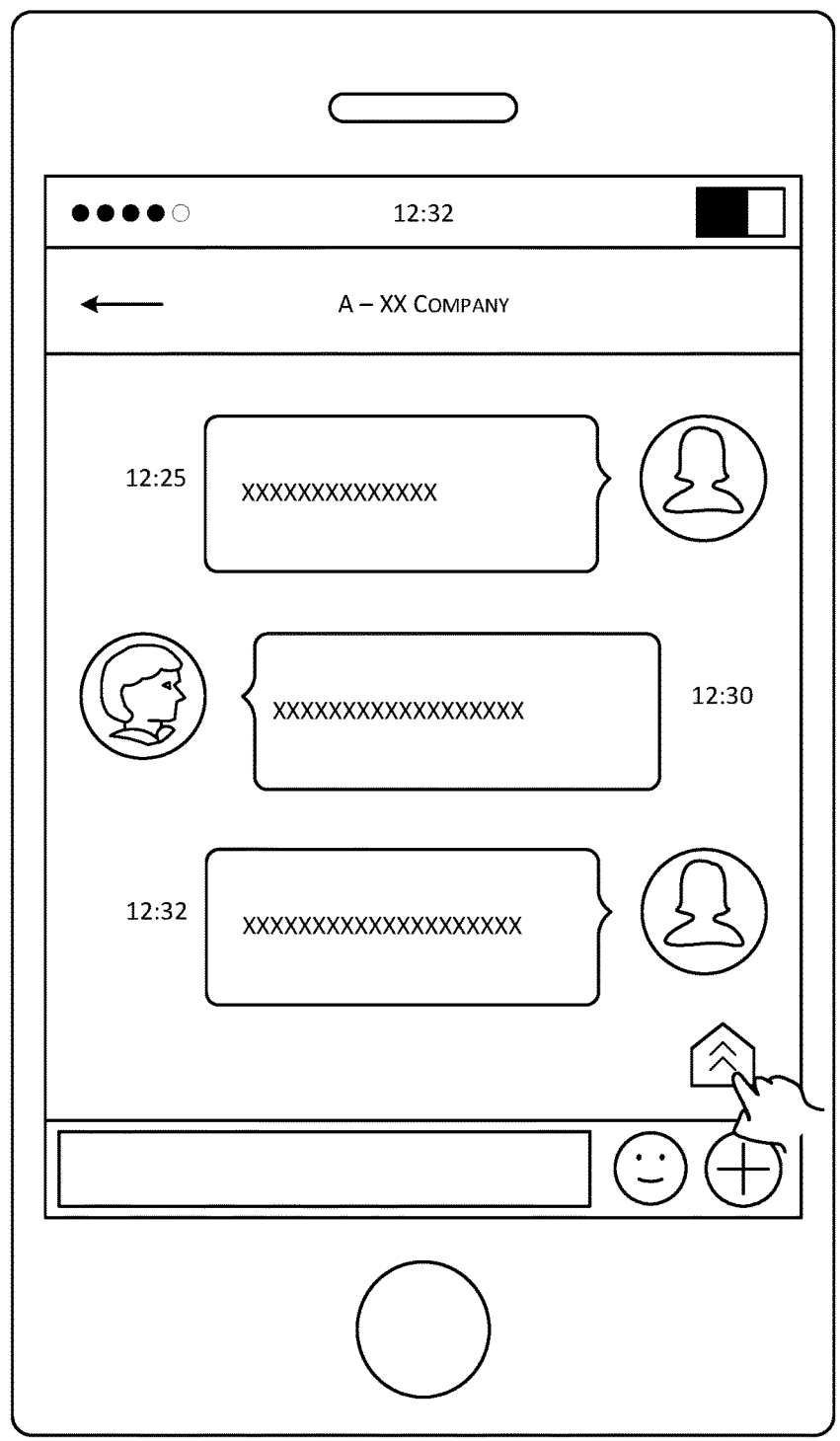
FIG. 9B is a schematic diagram of a communication session page according to an exemplary embodiment of the present disclosure.

Therefore, when the electronic device used by the user B receives the file acquisition notification, if the notification message including the access entry is not in a screen display area of the communication session page of the user A and the user B, a jump icon as shown in FIG. 9B may be displayed in the screen display area. On the one hand, the jump icon may prompt the user B to obtain the corresponding file through the above notification message, to prevent the user B from forgetting due to the communication conversations. On the other hand, in response to detecting that a triggering operation of the user B is performed on the jump icon, a jump to the context corresponding to the notification message may be performed automatically, so that the user B performs an operation of obtaining the related file through the notification message.

Operation 420: The server receives a download request sent by the user B.

Operation 422: The server transmits the related file to the user B.

In implementations, triggering the "download" functional option by the user B is used as an example. The server transmits the file "project introduction.doc" to the user B according to the corresponding download request. In practice, the notification message that is sent in operation 404 may include the access entry to the related file. However, since the user B has not obtained the access privilege for the related file, when the user B triggers the message box as shown in FIG. 6, the electronic device used by the user B may limit the access entry without initiating an access to the server, or the server does not respond correctly even though the access is initiated. After the server grants the user B an access privilege of the file "project introduction.doc", when the user B initiates an access to the server through a functional option as shown in FIG. 9A, the server will respond correctly to satisfy the file acquisition need of the user B.

Figure 10:
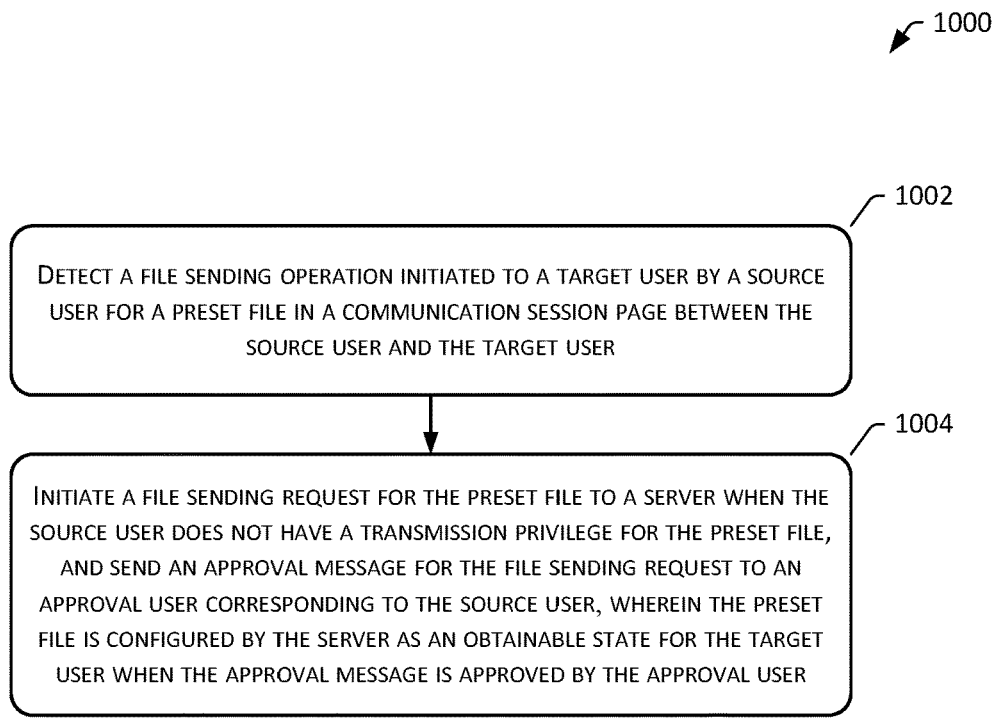
FIG. 10 is a flowchart of still another file transmission method according to an exemplary embodiment of the present disclosure.

FIG. 10 is a flowchart of still another file transmission method 1000 according to an exemplary embodiment of the present disclosure. As shown in FIG. 10, the method 1000 is applied in a client of a communication application. The client is configured in an electronic device that is used by a source user, and the method 1000 may include the following operations.

Operation 1002: Detect a file sending operation initiated to a target user by a source user for a preset file in a communication session page between the source user and the target user.

Operation 1004: Initiate a file sending request for the preset file to a server when the source user does not have a transmission privilege for the preset file, and send an approval message for the file sending request to an approval user corresponding to the source user, wherein the preset file is configured by the server as an obtainable state for the target user when the approval message is approved by the approval user.

In implementations, the client may query the server to determine whether the source user has a transmission privilege for the preset file. When respective group attribution information the source user and the target user is consistent, the source user may be determined as having the transmission privilege. Otherwise, the source user may be determined as having no transmission privilege.

Figure 11:
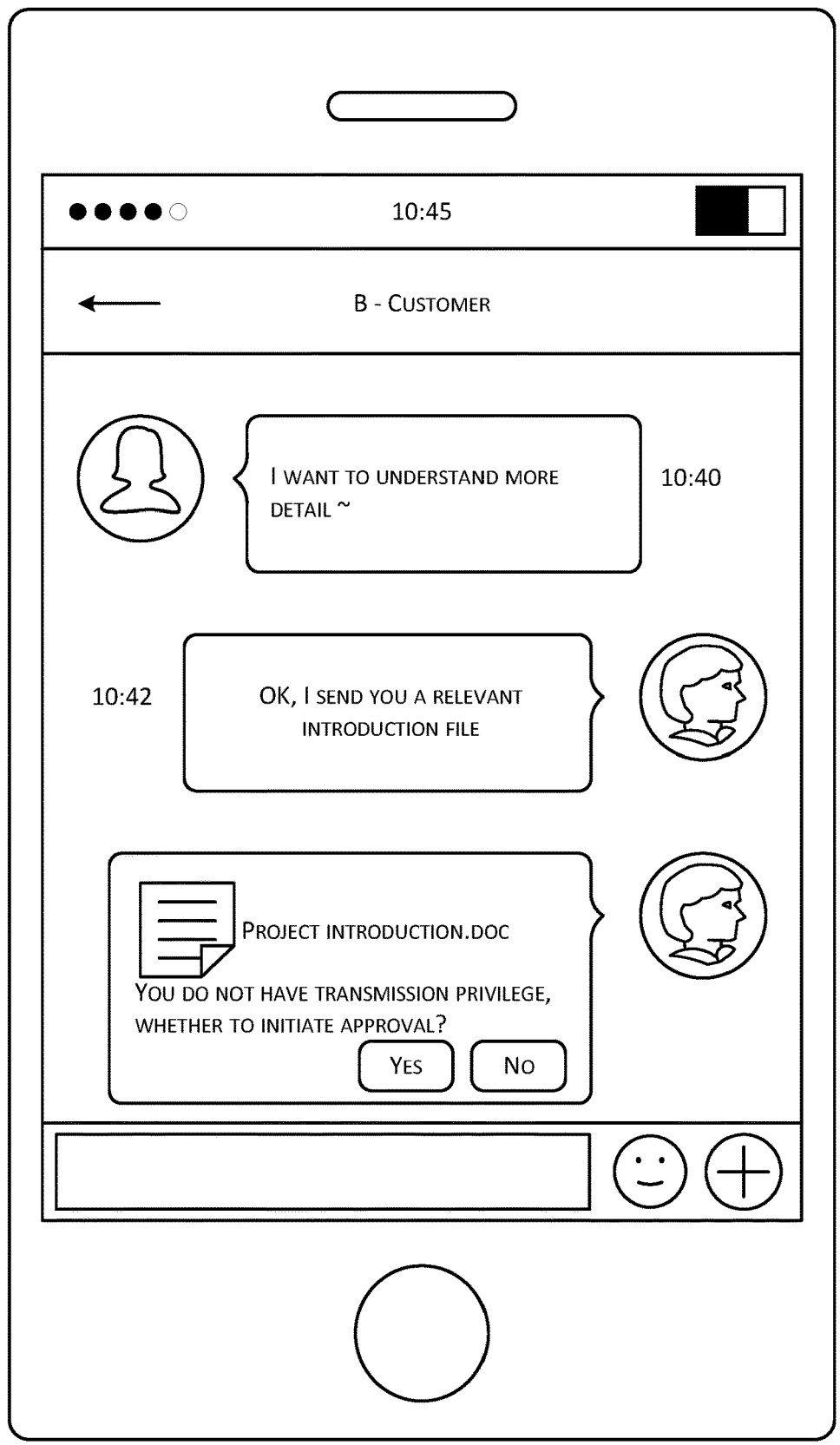
FIG. 11 is a schematic diagram of another communication session page according to an exemplary embodiment of the present disclosure.
Figure 12:
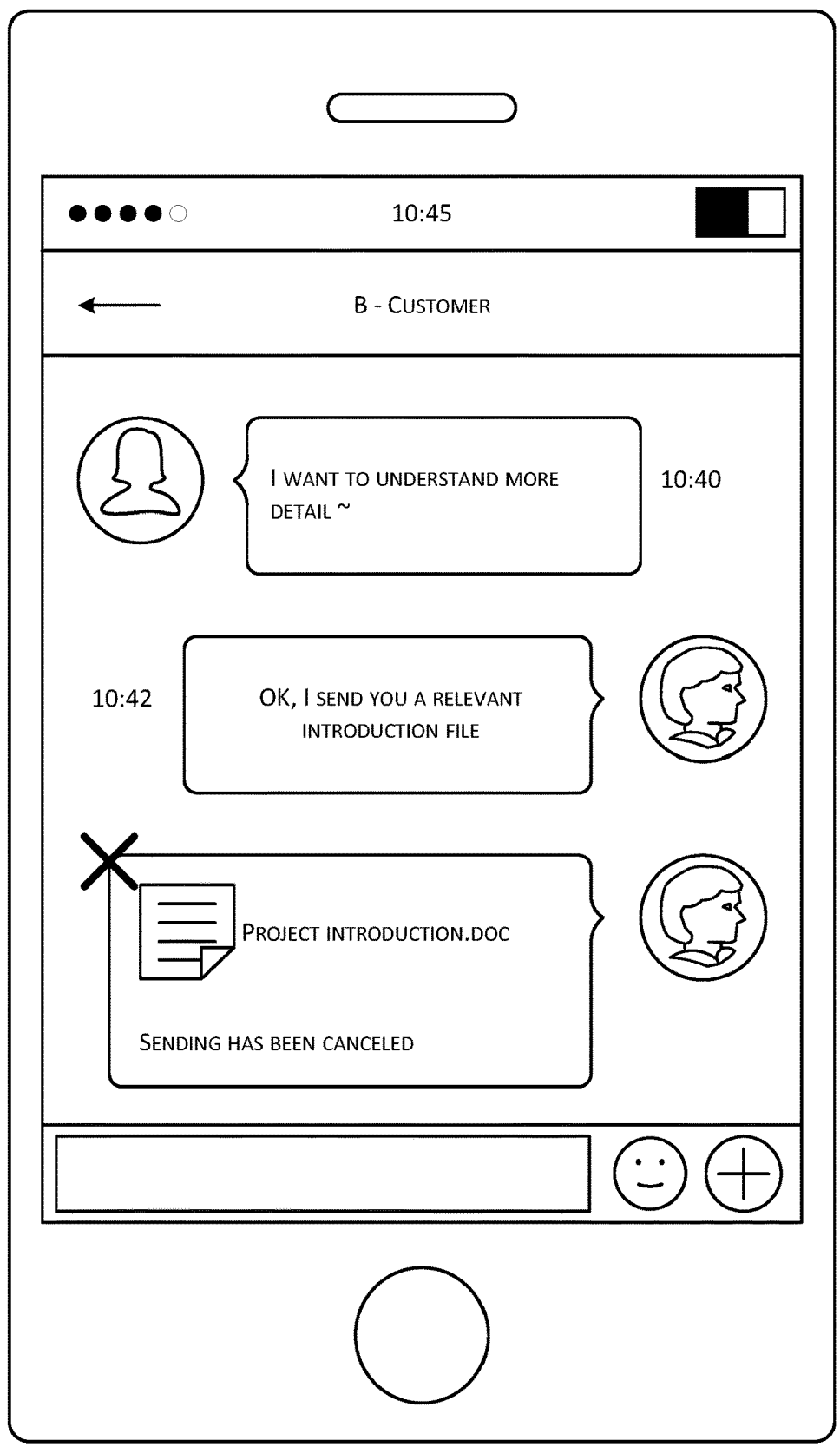
FIG. 12 is a schematic diagram of another communication session page according to an exemplary embodiment of the present disclosure.

In implementations, the electronic device used by the source user may directly send an approval message to a corresponding approval user when having no transmission privilege. Alternatively, as shown in FIG. 11, as prompt information such as "You do not have transmission privilege, whether to initiate approval" may first be shown to the source user, and approval sending options "Yes" and "No" may be provided. When the source user chooses to trigger "Yes", the client will initiate an approval message for the preset file (such as "project introduction.doc"). When the source user chooses to trigger "No", a "X" logo and a "Sending canceled" text description as shown in FIG. 12 are displayed to indicate that a transmission of the relevant preset file has been canceled and the relevant approval message will not be initiated.

By displaying approval sending options to the source user, the source user can intuitively determine and select whether to send an approval message to the approval user, to avoid causing any interference to the approval user even if the approval is canceled in time when the approval message is automatically sent to the approval user. In particular, the approval user is usually a management member within a group, and likely has an approval authority for file transmission of many group members at the same time. In this case, displaying approval sending options to each group member, the group member can cancel unnecessary or not urgent approval messages in time, which can greatly reduce interference to the management member as compared to manual cancellation after automatic transmission of the approval messages.

In implementations, similar to the above embodiments as shown in FIG. 3 and FIG. 4, when the file sending operation is detected, a message box corresponding to the preset file may also be displayed in a communication session page, and approval status information of the approval message may be displayed at an associated area of the message box. For example, the approval status information may include "under approval" on the left side of the message box as shown in FIG. 5 and "✓ approved" shown in FIG. 8, to help the source user to quickly understand the approval status.

Furthermore, a reminder option may be displayed at an associated area of the message box, and a reminder message for the approval message is sent to the approval user according to a triggering operation of the reminder option by the source user, to remind the approval user to process the approval message. The reminder option may be continuously displayed, or may be displayed in a form of a functional box shown in FIG. 7 after the source user triggers the "under approval" as shown in FIG. 5, which is not limited in the present disclosure.

Figure 13:
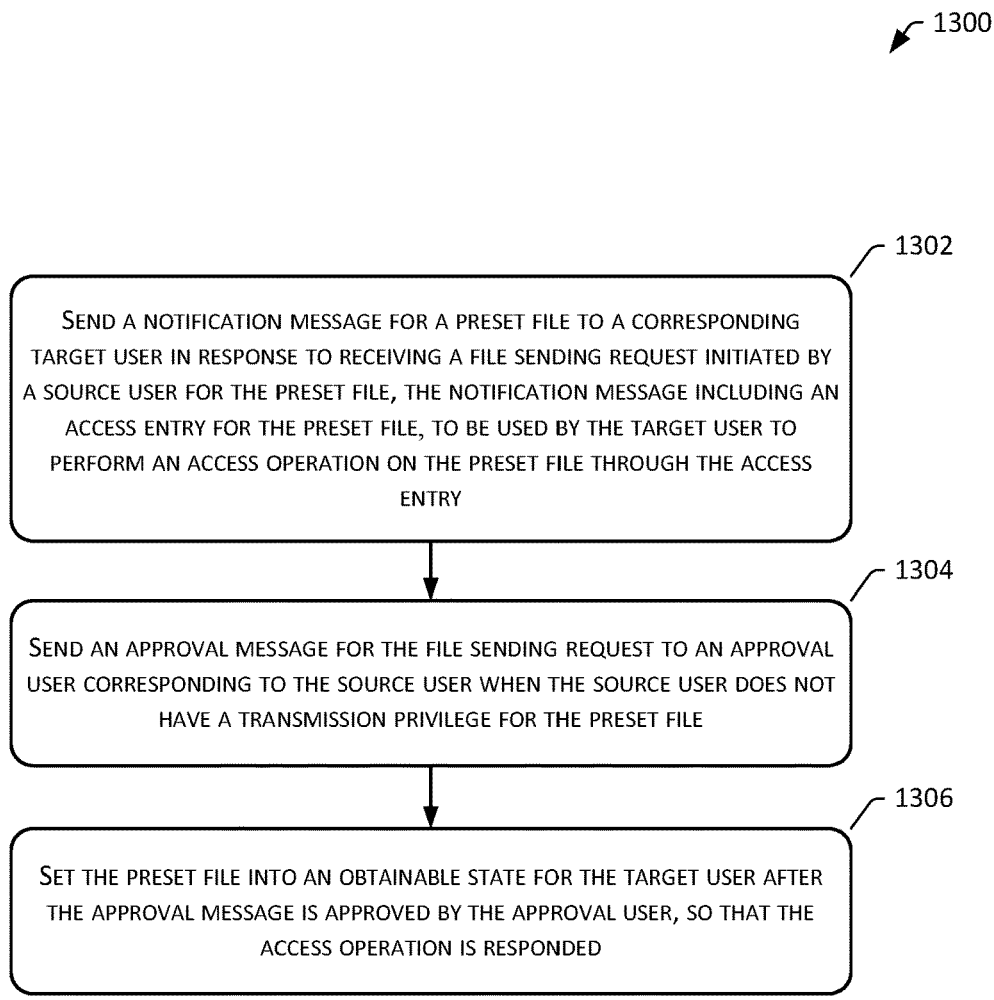
FIG. 13 is a flowchart of still another file transmission method according to an exemplary embodiment of the present disclosure.

FIG. 13 is a flowchart of still another file transmission method 1300 according to an exemplary embodiment of the present disclosure. As shown in FIG. 13, the method 1300 is applied in a server end of a communication application, and the method 1300 may include the following operations.

Operation 1302: Send a notification message for a preset file to a corresponding target user in response to receiving a file sending request initiated by a source user for the preset file, the notification message including an access entry for the preset file, to be used by the target user to perform an access operation on the preset file through the access entry.

In implementations, when receiving a file sending request, the server end first sends a notification message including an access entry to a target user to notify the target user that a relevant file sending activity exists. Since the target user has not obtained an access privilege for that file, and the target user is thus not able to perform a corresponding access operation through the access entry. Therefore, the security of the file is ensured.

Operation 1304: Send an approval message for the file sending request to an approval user corresponding to the source user when the source user does not have a transmission privilege for the preset file.

Operation 1306: Set the preset file into an obtainable state for the target user after the approval message is approved by the approval user, so that the access operation is responded.

In implementations, by setting the preset file into an obtainable state, for example, granting the target user the right to obtain the file, the target user is allowed to perform an access operation on the file based on the access entry included in the notification message. Furthermore, on the one hand, by showing a jump icon such as the one shown in FIG. 9B on a communication session page, the target user can be prompted to obtain the file through the above notification message, to preventing the target user from forgetting thereof due to communication conversations. On the other hand, when a triggering operation of the jump icon by the target user is detected, a jump may automatically be made to the context corresponding to the notification message, to facilitate the target user to perform an operation of obtaining the related file through the notification message.

Figure 14:
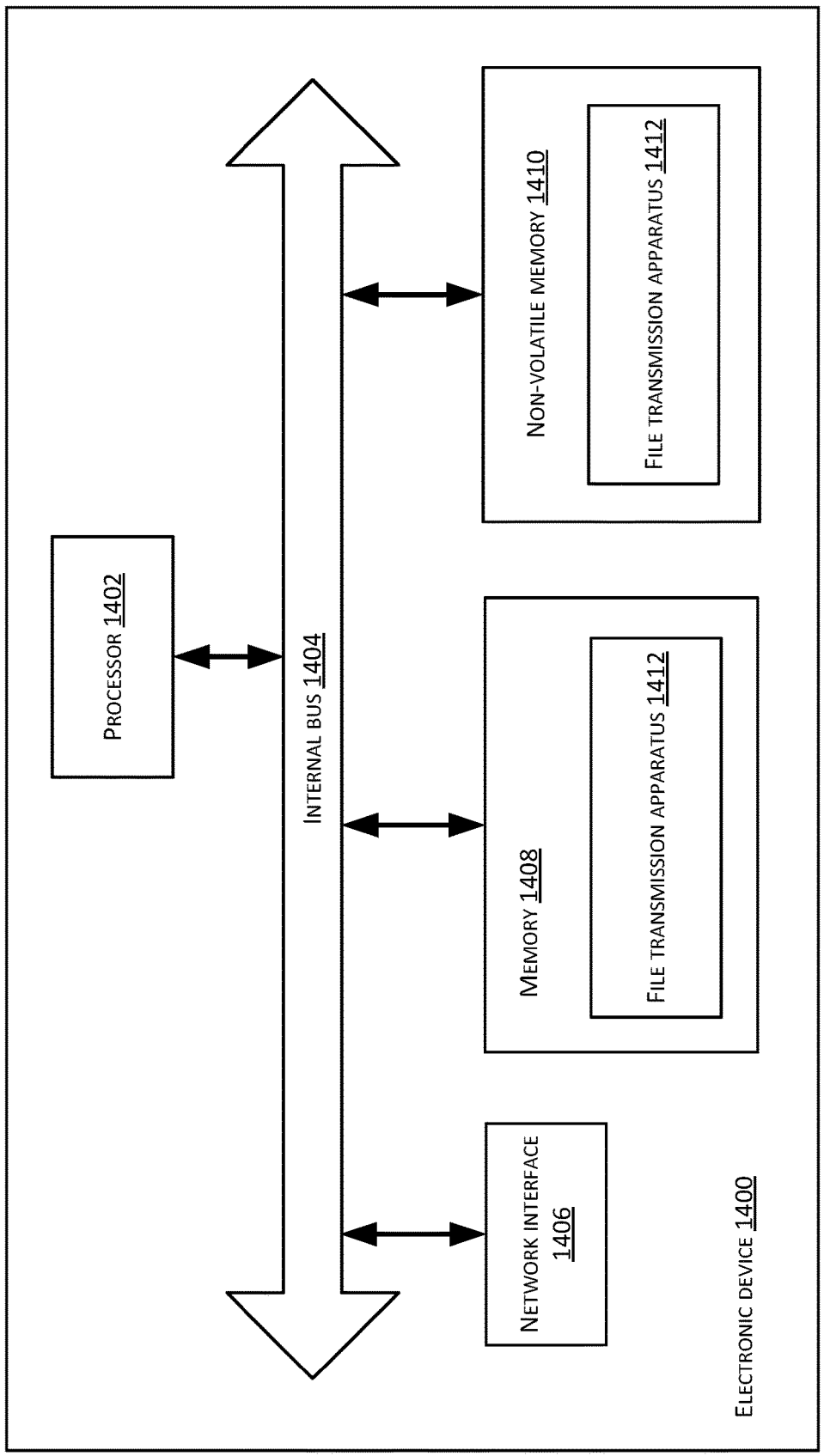
FIG. 14 is a schematic structural diagram of an electronic device according to an exemplary embodiment of the present disclosure.

FIG. 14 shows a schematic structural diagram of an electronic device 1400 according to an exemplary embodiment of the present disclosure. Referring to FIG. 14, at the hardware level, the electronic device 1400 includes a processor 1402, an internal bus 1404, a network interface 1406, memory 1408, and non-volatile memory 1410, and apparently may also include hardware needed by other services. The processor 1402 reads a corresponding computer program from the non-volatile memory 1410 into the memory 1402 and then operates to form a file transmission apparatus 1412 at the logical level. Apparently, in addition to software implementations, the present disclosure does not exclude other manners of implementation, such as a logic device or a combination of software and hardware, etc. In other words, an execution body of the following flow of processing is not limited to each logical unit, and may be a hardware or logic device.

Figure 15:
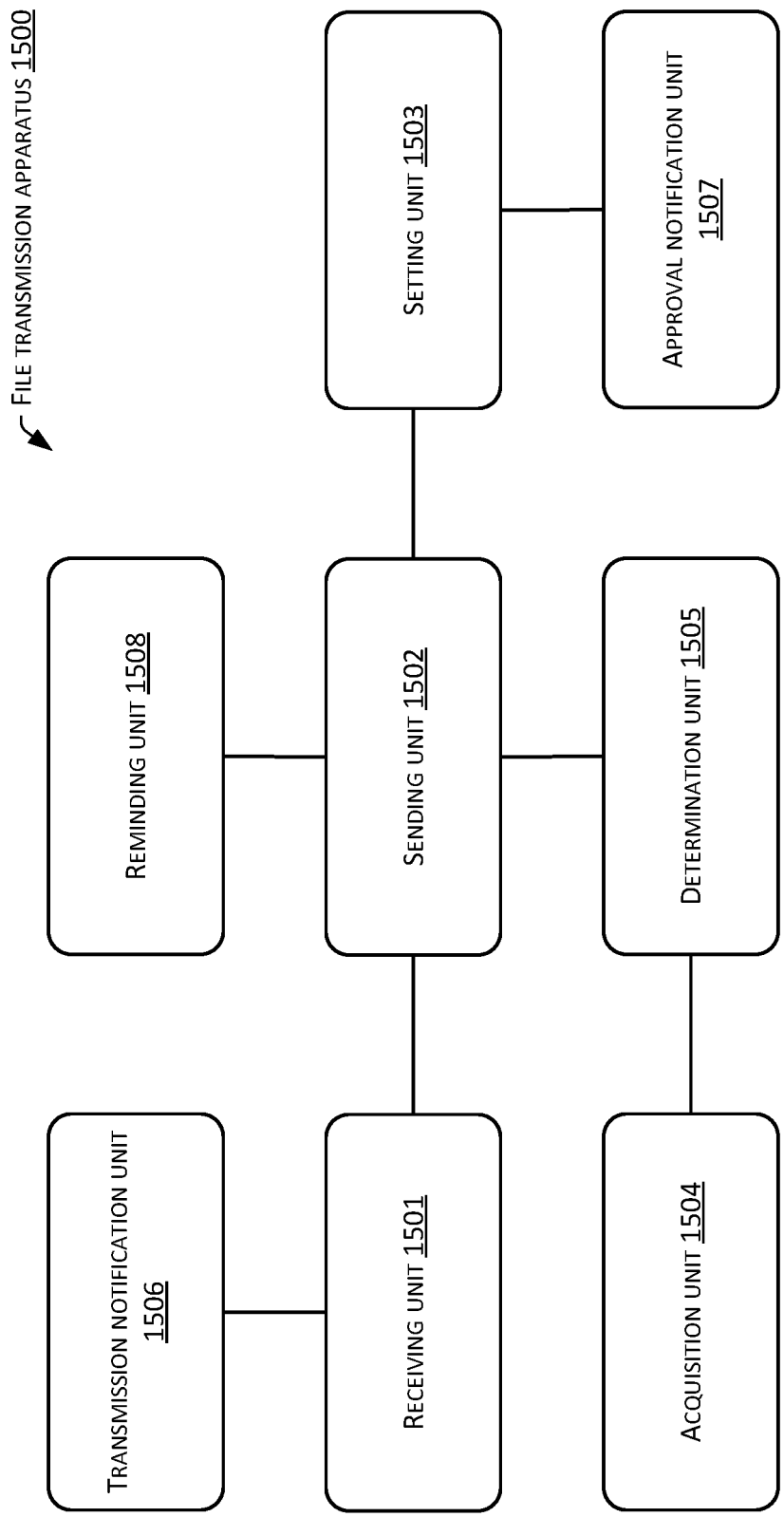
FIG. 15 is a block diagram of a file transfer apparatus according to an exemplary embodiment of the present disclosure.

Referring to FIG. 15, in implementations, a file transmission apparatus 1500 may include a receiving unit 1501, a sending unit 1502, and a setting unit 1503.

The receiving unit 1501 receives a file sending request for a preset file initiated by a source user.

The sending unit 1502 sends an approval message for the file sending request to an approval user corresponding to the source user when the source user does not have a transmission privilege for the preset file.

The setting unit 1503 sets the preset file into an obtainable state for a target user corresponding to the file sending request when the approval message is approved by the approval user.

In implementations, the apparatus 1500 may further include an acquisition unit 1504 that obtains respective group attribution information of the source user and the target user; and a determination unit 1505 that determines the source user to have no transmission privilege for the preset file, when the respective group attribution information of the source user and the target user is inconsistent and the preset file belongs to a group to which the source user belongs.

In implementations, the sending unit 1502 may further be configured to select a specific approval user corresponding to a security level of the preset file from among all approved users corresponding to the source user according to the security level; and send the approval message to the specific approved user.

In implementations, the setting unit 1503 may further be configured to grant the target user an access privilege for the preset file when the approval message is approved by the approval user, so that an access operation performed by the target user on the preset file is responded.

In implementations, the apparatus 1500 may further include a transmission notification unit 1506 that sends a notification message for the preset file to the target user when receiving the file sending request, the notification message including an access entry for the preset file, to be used by the target user to perform the access operation on the preset file through the access entry.

In implementations, the apparatus 1500 may further include an approval notification unit 1507 that transmits a notification message regarding an approval status of the preset file to at least one of the source user and the target user.

In implementations, the apparatus may further include a reminding unit 1508 that sends a corresponding reminder message to the approval user to remind the approval user to process the approval message according to a reminder request for the approval message initiated by the source user.

Figure 16:
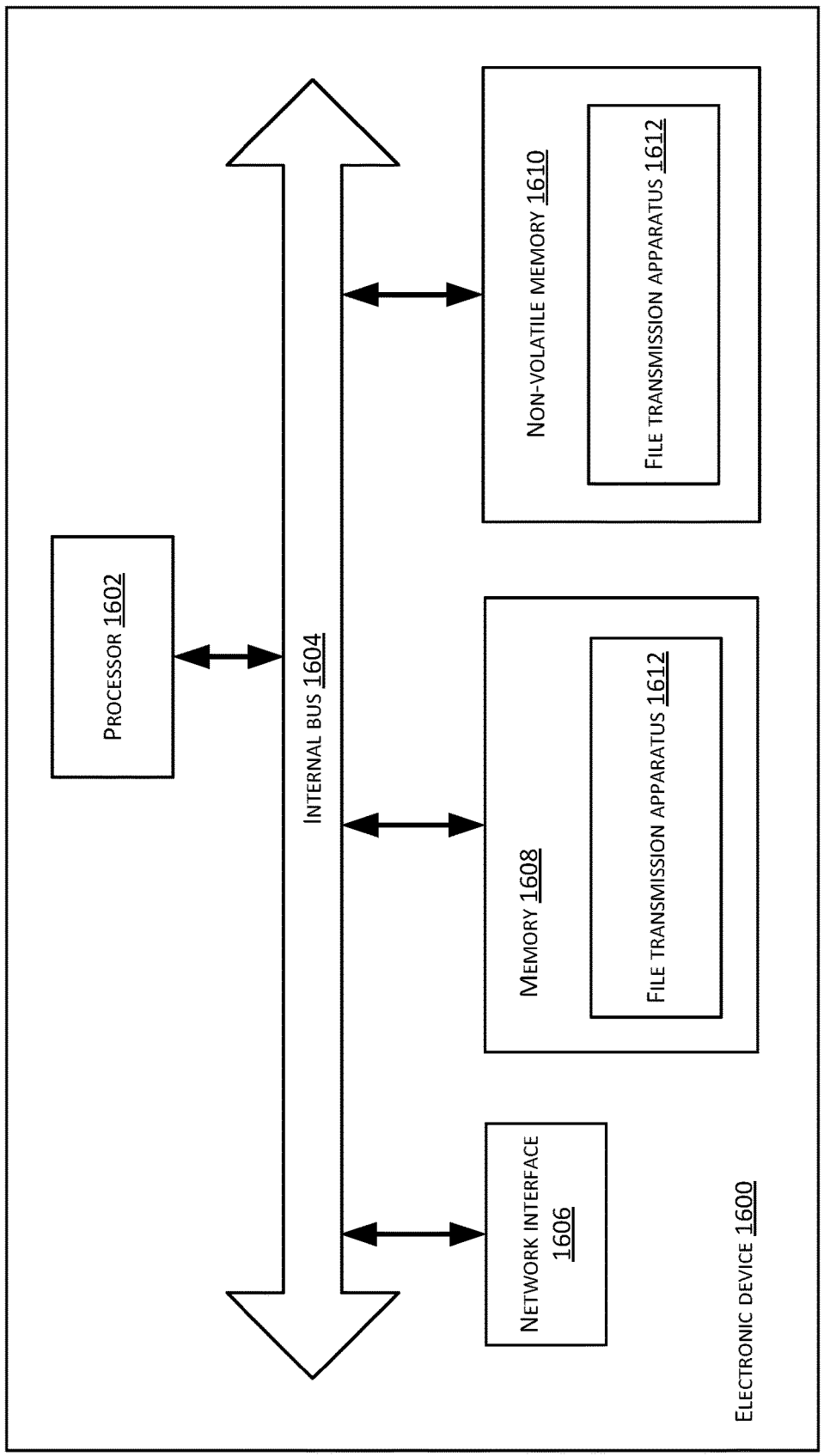
FIG. 16 is a schematic structural diagram of another electronic device according to an exemplary embodiment of the present disclosure.

FIG. 16 shows a schematic structural diagram of an electronic device 1600 according to an exemplary embodiment of the present disclosure. Referring to FIG. 16, at the hardware level, the electronic device 1600 includes a processor 1602, an internal bus 1604, a network interface 1606, memory 1608, and non-volatile memory 1610, and apparently may also include hardware needed by other services. The processor 1602 reads a corresponding computer program from the non-volatile memory 1610 into the memory 1602 and then operates to form a file transmission apparatus 1612 at the logical level. Apparently, in addition to software implementations, the present disclosure does not exclude other manners of implementation, such as a logic device or a combination of software and hardware, etc. In other words, an execution body of the following flow of processing is not limited to each logical unit, and may be a hardware or logic device.

Figure 17:
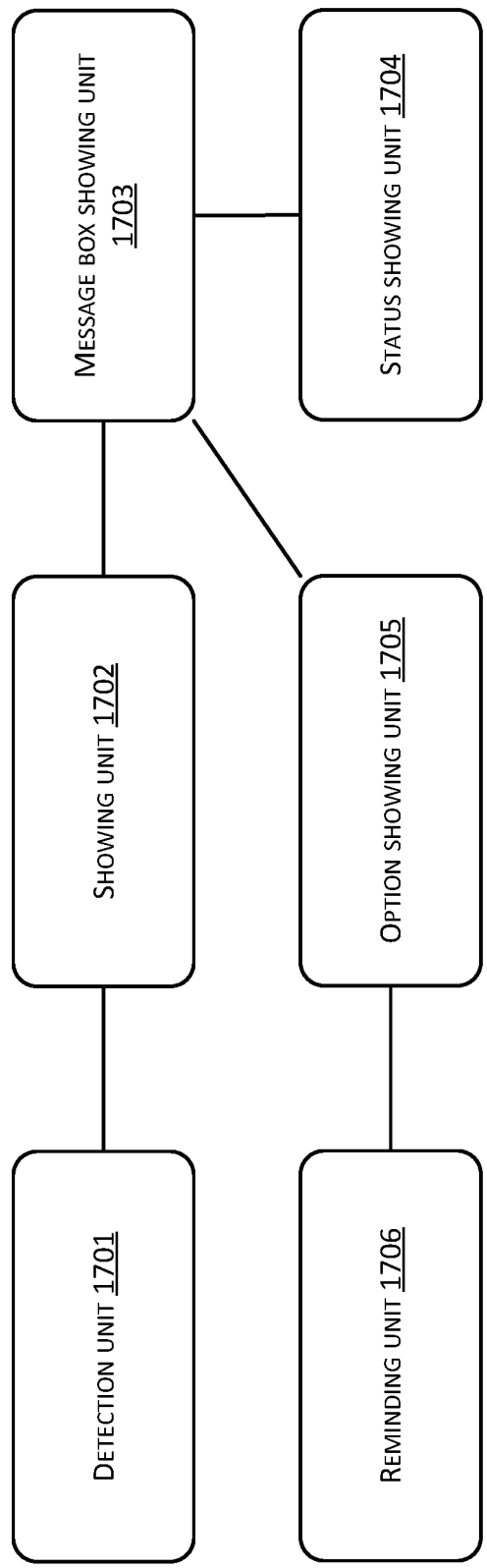
FIG. 17 is a block diagram of another file transfer apparatus according to an exemplary embodiment of the present disclosure.

Referring to FIG. 17, in implementations, a file transmission apparatus 1700 may include a detection unit 1701 and a showing unit 1702.

The detection unit 1701 detects a file sending operation initiated by a source user to a target user for a preset file in a communication session page of the source user and the target user.

The showing unit 1702 initiates a file sending request for the preset file to a server and sends an approval message for the preset file to an approval user corresponding to the source user when the source user does not have a transmission privilege for the preset file, wherein the preset file is set by the server as an obtainable state for the target user when the approval message is approved by the approval user.

In implementations, the apparatus 1700 may further include a message box showing unit 1703 that displays a message box corresponding to the preset file in the communication session page in response to detecting the file sending operation; and a status showing unit 1704 that displays approval status information of the approval message at an associated area of the message box.

In implementations, the apparatus 1700 may further include an option showing unit 1705 that displays a reminder option at the associated area of the message box; and a reminding unit 1706 that sends a reminder message for the approval message to the approval user according to a triggering operation of the reminder option by the source user, to remind the approval user to process the approval message.

Figure 18:
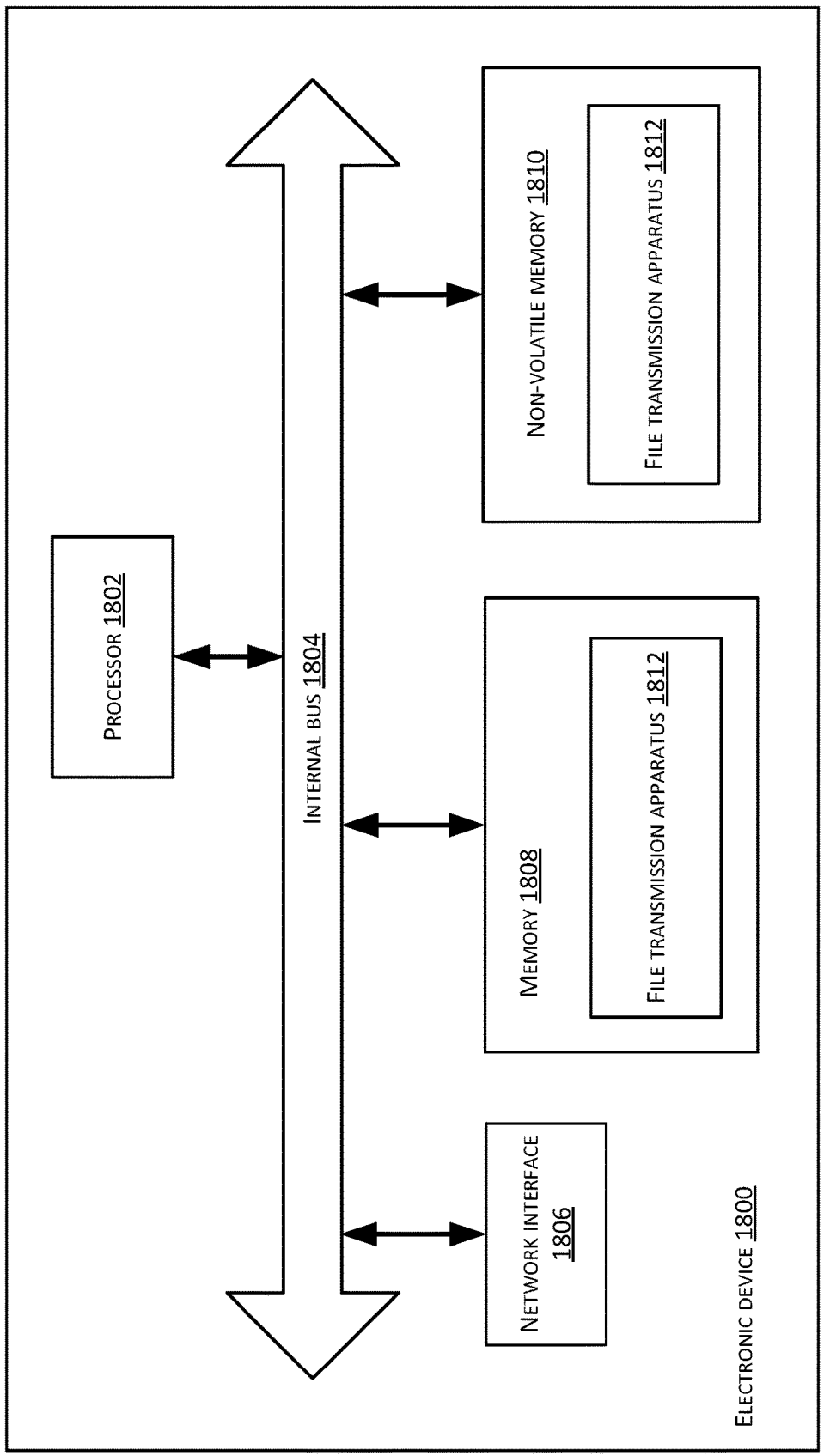
FIG. 18 is a schematic structural diagram of still another electronic device according to an exemplary embodiment of the present disclosure.

FIG. 18 shows a schematic structural diagram of an electronic device 1800 according to an exemplary embodiment of the present disclosure. Referring to FIG. 18, at the hardware level, the electronic device 1800 includes a processor 1802, an internal bus 1804, a network interface 1806, memory 1808, and non-volatile memory 1810, and apparently may also include hardware required by other services. The processor 1802 reads a corresponding computer program from the non-volatile memory 1810 into the memory 1802 and then operates to form a file transmission apparatus 1812 at the logical level. Apparently, in addition to software implementations, the present disclosure does not exclude other manners of implementation, such as a logic device or a combination of software and hardware, etc. In other words, an execution body of the following flow of processing is not limited to each logical unit, and may be a hardware or logic device.

Figure 19:
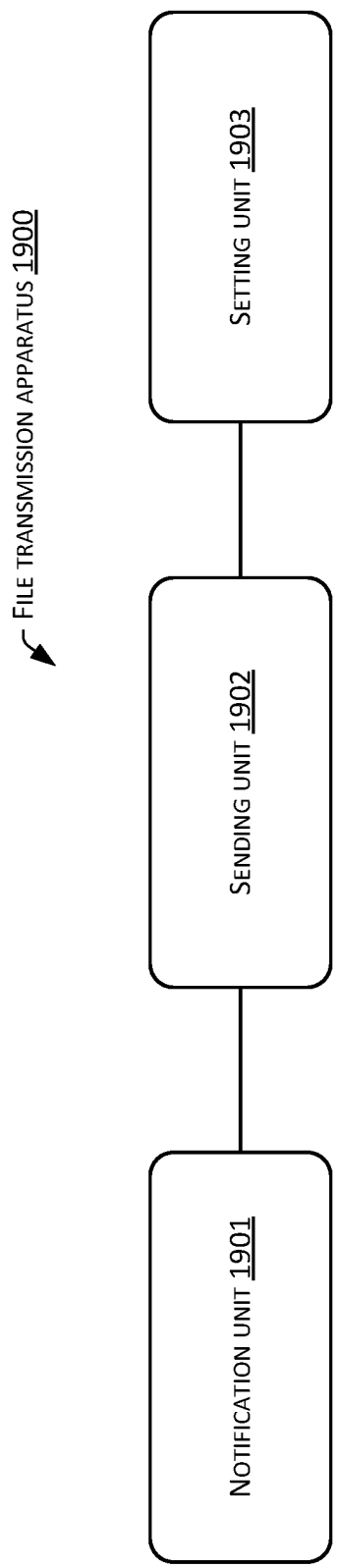
FIG. 19 is a block diagram of still another file transfer apparatus according to an exemplary embodiment of the present disclosure.

Referring to FIG. 19, in implementations, a file transmission apparatus 1900 may include a notification unit 1901, a sending unit 1902, and a setting unit 1903.

The notification unit 1901 sends a notification message for a preset file to a corresponding target user in response to receiving a file sending request initiated by a source user for the preset file, the notification message including an access entry for the preset file to be used for performing an access operation on the preset file by the target user through the access entry.

The sending unit 1902 sends an approval message for the file sending request to an approval user corresponding to the source user when the source user does not have a transmission privilege for the preset file.

The setting unit 1903 sets the preset file as an obtainable state for the target user to cause the access operation to be responded in response to the approval message being approved by the approval user.

Figure 20:
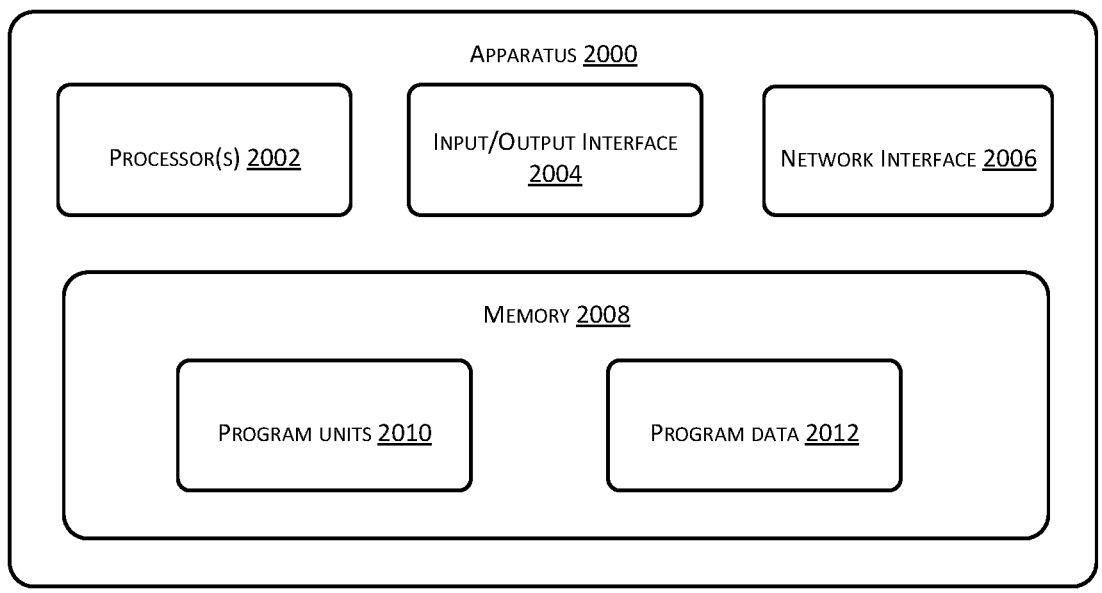
FIG. 20 is a schematic structural diagram of the file transmission apparatus as described in FIGS. 15, 17, and 19 in more detail.

FIG. 20 shows an example apparatus 2000 as described in FIGS. 15, 17, and 19 in more detail. In implementations, the apparatus 2000 may include one or more computing devices. In a typical configuration, a computing device includes one or more processors (CPUs), input/output interfaces, network interfaces, and memory. In implementations, the apparatus 2000 may be a part of one or more computing devices, e.g., implemented or run by the one or more computing devices. In implementations, the one or more computing devices may be located in a single place or distributed among a plurality of network devices over a network. By way of example and not limitation, the apparatus 2000 may include one or more processors 2002, an input/output (I/O) interface 2004, a network interface 2006, and memory 2008.

The memory 2008 may include a form of computer readable media such as a volatile memory, a random access memory (RAM) and/or a non-volatile memory, for example, a read-only memory (ROM) or a flash RAM. The memory 2008 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 2008 may include program modules 2010 and program data 2012. Depending on which apparatus (e.g., the apparatus 1500, the apparatus 1700, and the apparatus 1900) that the apparatus 2000 represents, the program modules 2010 may include one or more of the units as described in the foregoing description and shown in FIGS. 15, 17, and 19.

It is also noted that terms "include", "contain" or any other variations are intended to encompass a non-exclusive inclusion, such that a process, method, product, or device that includes a series of elements not only includes these elements, but also includes other elements that are not explicitly listed, or also includes elements that are inherent to such process, method, product, or device. Without further limitation, an element that is defined by a phrase "comprising a . . . " does not exclude the presence of other identical elements in a process, method, product, or device that includes the element.

Exemplary embodiments are described in detail herein, and examples thereof are illustrated in the accompanying drawings. When the accompanying drawings are involved in the following description, same or similar numbers in different figures represent same or similar elements, unless indicated otherwise. Implementations described in the following exemplary embodiments do not represent all the embodiments that are consistent with the present disclosure.

Instead, they are merely examples of apparatuses and methods that are consistent with some aspects of the present disclosure as detailed in the appended claims.

Terminologies used in the present disclosure are merely for the purpose of describing particular embodiments, and are not intended to limit the present disclosure. Singular forms "a", "said" and "the" are intended to include plural forms, unless stated clearly in the context otherwise. It should also be understood that a term "and/or" used herein refers to and includes any or all possible combinations of one or more of associated items that are listed.

It should be understood that, although terms such as first, second, third, etc. may be used in the present disclosure to describe various types of information, these pieces of information should not be limited to these terms. These terms are merely used for distinguishing information of the same type. For example, without departing from the scope of the present disclosure, first information may also be referred to as second information, and similarly, the second information may also be referred to as the first information. Depending on the context, a term "if" used herein may be interpreted as "when" or "in an event of" or "in response to determining".

The above description merely corresponds to preferred embodiments of the present disclosure, and is not intended to limit the present disclosure. Any modifications, equivalent replacements, improvements, etc. that are made within the spirit and principles of the present disclosure are included in the scope of protection of the present disclosure.

The present disclosure can be further understood using the following clauses.

Clause 1: A file transmission method comprising: receiving a file sending request initiated by a source user for a preset file; sending an approval message for the file sending request to an approval user corresponding to the source user when the source user does not have a transmission privilege for the preset file; and setting the preset file as an obtainable state for a target user corresponding to the file sending request in response to the approval message being approved by the approval user.

Clause 2: The method of Clause 1, further comprising: obtaining respective group attribution information of the source user and the target user; and determining that the source user does not have the transmission privilege for the preset file in response to the respective group attribution information of the source user and the target user being inconsistent and the preset file belonging to a group to which the source user belongs.

Clause 3: The method of Clause 1, wherein sending the approval message for the file sending request to the approval user corresponding to the source user comprises: selecting a specific approval user corresponding to a security level of the preset file from among all approved users corresponding to the source user according to the security level; and sending the approval message to the specific approved user.

Clause 4: The method of Clause 1, wherein setting the preset file as the obtainable state for the target user corresponding to the file sending request in response to the approval message being approved by the approval user comprises granting the target user an access privilege for the preset file when the approval message is approved by the approval user, so that an access operation performed by the target user on the preset file is responded.

Clause 5: The method of Clause 4, further comprising sending a notification message for the preset file to the target user in response to receiving the file sending request, the notification message including an access entry for the preset file, to be used by the target user to perform the access operation on the preset file through the access entry.

Clause 6: The method of Clause 1, further comprising sending a notification message regarding an approval status of the preset file to at least one of the source user and the target user.

Clause 7: The method of Clause 1, further comprising sending a corresponding reminder message to the approval user to remind the approval user to process the approval message according to a reminder request for the approval message initiated by the source user.

Clause 8: A file transmission method comprising: detecting a file sending operation initiated by a source user to a target user for a preset file in a communication session page of the source user and the target user; and initiating a file sending request for the preset file to a server and sending an approval message for the preset file to an approval user corresponding to the source user when the source user does not have a transmission privilege for the preset file, wherein the preset file is set by the server as an obtainable state for the target user when the approval message is approved by the approval user.

Clause 9: The method of Clause 8, further comprising: displaying an approval sending option to the source user when the source user does not have a transmission privilege for the preset file; and sending the approval message to the approval user according to a triggering operation of the approval sending option by the source user.

Clause 10: A file transmission method comprising: sending a notification message for a preset file to a corresponding target user in response to receiving a file sending request initiated by a source user for the preset file, the notification message including an access entry for the preset file to be used for performing an access operation on the preset file by the target user through the access entry; sending an approval message for the file sending request to an approval user corresponding to the source user when the source user does not have a transmission privilege for the preset file; and setting the preset file into an obtainable state for the target user to cause the access operation to be responded in response to the approval message being approved by the approval user.

Clause 11: A file transmission apparatus comprising: a receiving unit that receives a file sending request for a preset file initiated by a source user; a sending unit that sends an approval message for the file sending request to an approval user corresponding to the source user when the source user does not have a transmission privilege for the preset file; and a setting unit that sets the preset file into an obtainable state for a target user corresponding to the file sending request when the approval message is approved by the approval user.

Clause 12: The apparatus of Clause 11, further comprising: an acquisition unit that obtains respective group attribution information of the source user and the target user; and a determination unit that determines the source user to have no transmission privilege for the preset file, when the respective group attribution information of the source user and the target user is inconsistent and the preset file belongs to a group to which the source user belongs.

Clause 13: A file transmission apparatus comprising: a detection unit that detects a file sending operation initiated by a source user to a target user for a preset file in a communication session page of the source user and the target user; and a showing unit that initiates a file sending request for the preset file to a server and sends an approval message for the preset file to an approval user corresponding to the source user when the source user does not have a transmission privilege for the preset file, wherein the preset file is set by the server as an obtainable state for the target user when the approval message is approved by the approval user.

Clause 14: A file transmission apparatus comprising: a notification unit that sends a notification message for a preset file to a corresponding target user in response to receiving a file sending request initiated by a source user for the preset file, the notification message including an access entry for the preset file to be used for performing an access operation on the preset file by the target user through the access entry; a sending unit that sends an approval message for the file sending request to an approval user corresponding to the source user when the source user does not have a transmission privilege for the preset file; and a setting unit that sets the preset file as an obtainable state for the target user to cause the access operation to be responded in response to the approval message being approved by the approval user.

What is claimed is:

1. A method implemented by one or more computing devices, the method comprising:
   receiving a file sending request initiated by a source user for a preset file, the file sending request being generated upon detecting an operation of the source user to transmit the preset file to a target user in a communication session page between the source user and the target user and the preset file being associated with a security level;
   determining an approval user according to the security level, the approval user having a management authority level to approve transmission of the preset file;
   sending an approval message for the file sending request to the approval user corresponding to the source user when the source user does not have a transmission privilege for the preset file;
   displaying, on the communication session page, a message including an access entry to the preset file and a status indicating pending approval of accessing the preset file; and
   updating the status to indicate authorized operations of the preset file via the access entry in response to the approval message being approved by the approval user.

2. The method of claim 1, further comprising obtaining respective group attribution information of the source user and the target user.

3. The method of claim 2, further comprising:
   determining that the source user does not have the transmission privilege for the preset file in response to the respective group attribution information of the source user and the target user being inconsistent and the preset file belonging to a group to which the source user belongs.

4. The method of claim 1, wherein sending the approval message for the file sending request to the approval user corresponding to the source user comprises selecting the approval user corresponding to the security level of the preset file from among all approved users corresponding to the source user according to the security level.

5. The method of claim 1, further comprising:
   setting the preset file as the obtainable status for the target user, granting the target user an access privilege for the preset file when the approval message is approved by the approval user, so that an access operation performed by the target user via the access entry to the preset file is responded.

6. The method of claim 1, further comprising sending a notification message for the preset file to the target user in response to receiving the file sending request.

7. The method of claim 6, wherein the notification message comprises the access entry for the preset file, to be used by the target user to perform the access operation on the preset file through the access entry.

8. The method of claim 1, further comprising sending a notification message regarding an approval status of the preset file to at least one of the source user and the target user.

9. The method of claim 1, further comprising sending a corresponding reminder message to the approval user to remind the approval user to process the approval message according to a reminder request for the approval message initiated by the source user.

10. One or more computer readable media storing executable instructions that, when executed by one or more processors, cause the one or more processors to perform acts comprising:
    receiving a file sending request initiated by a source user for a preset file, the file sending request being generated upon detecting an operation of the source user to transmit the preset file to a target user in a communication session page between the source user and the target user and the preset file being associated with a security level;
    determining an approval user according to the security level, the approval user having a management authority level to approve transmission of the preset file;
    sending an approval message for the file sending request to the approval user corresponding to the source user when the source user does not have a transmission privilege for the preset file;
    displaying, on the communication session page, a message including an access entry to the preset file and a status indicating pending approval of accessing the preset file; and
    updating the status to indicate authorized operations of the preset file via the access entry in response to the approval message being approved by the approval user.

11. The one or more computer readable media of claim 10, the acts further comprising obtaining respective group attribution information of the source user and the target user.

12. The one or more computer readable media of claim 11, the acts further comprising determining that the source user does not have the transmission privilege for the preset file in response to the respective group attribution information of the source user and the target user being inconsistent and the preset file belonging to a group to which the source user belongs.

13. The one or more computer readable media of claim 10, wherein sending the approval message for the file sending request to the approval user corresponding to the source user comprises selecting the approval user corresponding to the security level of the preset file from among all approved users corresponding to the source user according to the security level.

14. The one or more computer readable media of claim 10, the acts further comprising:
    setting the preset file as the obtainable status for the target user, granting the target user an access privilege for the preset file when the approval message is approved by the approval user, so that an access operation performed by the target user via the access entry to the preset file is responded.

15. The one or more computer readable media of claim 10, the acts further comprising sending a notification message for the preset file to the target user in response to receiving the file sending request.

16. The one or more computer readable media of claim 15, wherein the notification message comprises the access entry for the preset file, to be used by the target user to perform the access operation on the preset file through the access entry.

17. The one or more computer readable media of claim 10, the acts further comprising sending a notification message regarding an approval status of the preset file to at least one of the source user and the target user.

18. The one or more computer readable media of claim 10, the acts further comprising sending a corresponding reminder message to the approval user to remind the approval user to process the approval message according to a reminder request for the approval message initiated by the source user.

19. An apparatus comprising:
one or more processors;
memory;
a detection unit stored in the memory and executable by the one or more processors to detect a file sending operation initiated by a source user to a target user for a preset file in a communication session page of the source user and the target user, the preset file being associated with a security level, and determine an approval user according to the security level, the approval user having a management authority level to approve transmission of the preset file; and
a showing unit stored in the memory and executable by the one or more processors to initiate a file sending request for the preset file to a server and send an approval message for the preset file to the approval user corresponding to the source user when the source user does not have a transmission privilege for the preset file, display, on the communication session page, a message including an access entry to the preset file and a status indicating pending approval of accessing the preset file and update the status to indicate authorized operations of the preset file via the access entry in response to the approval message being approved by the approval user.

20. The apparatus of claim 19, further comprising:
a message box showing unit stored in the memory and executable by the one or more processors to display a message box corresponding to the preset file in the communication session page in response to detecting the file sending operation; and
a status showing unit stored in the memory and executable by the one or more processors to display approval status information of the approval message at an associated area of the message box.

* * * * *